(12) United States Patent
Matsuda

(10) Patent No.: US 8,978,070 B2
(45) Date of Patent: Mar. 10, 2015

(54) CONTENT OUTPUT SYSTEM, INFORMATION DISPLAY APPARATUS, CONTENT OUTPUT APPARATUS, AND CONTENT INFORMATION DISPLAY METHOD

(75) Inventor: Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 1536 days.

(21) Appl. No.: 11/567,561

(22) Filed: Dec. 6, 2006

(65) Prior Publication Data
US 2007/0216667 A1 Sep. 20, 2007

(30) Foreign Application Priority Data

Dec. 6, 2005 (JP) .................................. 2005-352189

(51) Int. Cl.
*G06F 3/00* (2006.01)
*G06F 13/00* (2006.01)
(Continued)

(52) U.S. Cl.
CPC ......... *H04N 5/44582* (2013.01); *H04N 5/4403* (2013.01); *H04N 21/482* (2013.01); *H04N 21/4135* (2013.01); *H04N 21/42207* (2013.01);
(Continued)

(58) Field of Classification Search
CPC .................. H04N 21/42204; H04N 21/42208; H04N 21/4312; H04N 5/4403; H04N 21/482
USPC .................................. 725/80, 81, 59; 348/734
See application file for complete search history.

(56) References Cited

U.S. PATENT DOCUMENTS 6,130,726 A * 10/2000 Darbee et al. ................ 348/734
6,476,825 B1 * 11/2002 Croy et al. .................... 715/716
(Continued)

FOREIGN PATENT DOCUMENTS

JP  8-22653  1/1996
JP  2001-346187  12/2001
(Continued)

OTHER PUBLICATIONS

Office Action issued Mar. 8, 2011 in Japanese Application No. 2005-352189.

*Primary Examiner* — Nasser Goodarzi
*Assistant Examiner* — Kyu Chae
(74) *Attorney, Agent, or Firm* — Oblon, McClelland, Maier & Neustadt, L.L.P.

(57) ABSTRACT

A content output system includes a content output apparatus; and an information display apparatus, the content output apparatus and the information display apparatus being capable of communicating with each other. The content output apparatus includes a selection section configured to select, in response to a selection instruction, one piece of content from among a plurality of pieces of content that can be output, as content composed of a video signal and/or an audio signal; and an output section configured to output the content selected by the selection section. The information display apparatus includes a display section; and a control section configured to allow the display section to display, as content information display, information on the plurality of pieces of content that can be output from the content output apparatus in a state in which content that is output from the output section of the content output apparatus is displayed so as to be distinguished from remaining pieces of content that can be output.

8 Claims, 16 Drawing Sheets

(51) Int. Cl.
    *H04N 5/445*     (2011.01)
    *H04N 7/18*     (2006.01)
    *H04N 5/44*     (2011.01)
    *H04N 21/482*     (2011.01)
    *H04N 21/41*     (2011.01)
    *H04N 21/422*     (2011.01)
    *H04N 21/431*     (2011.01)
    *H04N 21/432*     (2011.01)
    *H04N 21/436*     (2011.01)
    *H04N 21/4363*     (2011.01)
    *H04N 21/643*     (2011.01)
    *H04N 21/472*     (2011.01)
    *H04N 21/433*     (2011.01)

(52) U.S. Cl.
    CPC ..... *H04N 21/42209* (2013.01); *H04N 21/4222* (2013.01); *H04N 21/4312* (2013.01); *H04N 21/4325* (2013.01); *H04N 21/43615* (2013.01); *H04N 21/43637* (2013.01); *H04N 21/64322* (2013.01); *H04N 21/47214* (2013.01); *H04N 2005/441* (2013.01); *H04N 21/4334* (2013.01)

USPC .................. 725/59; 725/37; 725/39; 725/40; 725/80; 725/81; 348/734

(56) References Cited

U.S. PATENT DOCUMENTS

| | | | |
|---|---|---|---|
| 7,461,343 B2 * | 12/2008 | Kates | 715/716 |
| 2002/0042915 A1 * | 4/2002 | Kubischta et al. | 725/38 |
| 2003/0035074 A1 * | 2/2003 | Dubil et al. | 348/734 |
| 2004/0148632 A1 * | 7/2004 | Park et al. | 725/81 |
| 2005/0088333 A1 * | 4/2005 | Allport | 341/176 |
| 2005/0155052 A1 * | 7/2005 | Ostrowska et al. | 725/25 |
| 2006/0107294 A1 * | 5/2006 | Rivlin et al. | 725/80 |
| 2006/0161865 A1 * | 7/2006 | Scott et al. | 715/810 |
| 2009/0010612 A1 * | 1/2009 | Allen et al. | 386/83 |

FOREIGN PATENT DOCUMENTS

| | | |
|---|---|---|
| JP | 2001-346270 | 12/2001 |
| JP | 2003-125305 | 4/2003 |
| WO | WO 98/16062 | 4/1998 |
| WO | WO 99/34564 | 7/1999 |

* cited by examiner

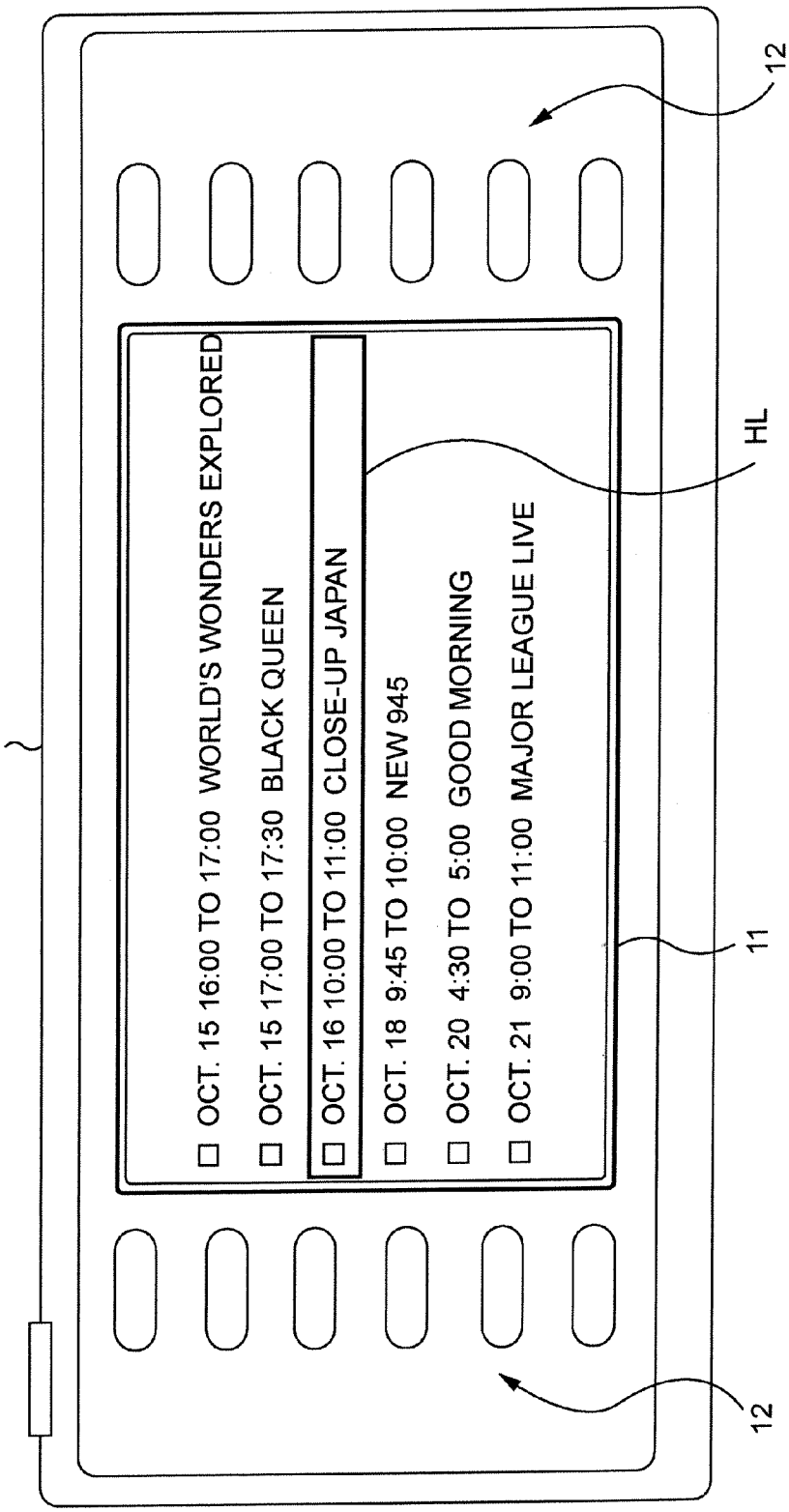

CONTENT OUTPUT SYSTEM, INFORMATION DISPLAY APPARATUS, CONTENT OUTPUT APPARATUS, AND CONTENT INFORMATION DISPLAY METHOD

CROSS REFERENCES TO RELATED APPLICATIONS

The present invention contains subject matter related to Japanese Patent Application JP 2005-352189 filed in the Japanese Patent Office on Dec. 6, 2005, the entire contents of which are incorporated herein by reference.

BACKGROUND OF THE INVENTION

1. Field of the Invention

The present invention relates to a content output system, an information display apparatus, a content output apparatus, and a content information display method. More particularly, the present invention relates to display of information about content of television broadcast programs, recorded broadcast programs, and various other kinds of video and audio.

2. Description of the Related Art

In recent years, household appliances, such as television receivers, video recorders, personal computers, and audio players, have been configured as a networked system in a house and the like, so that each device can function in such a way as to be synchronously operated in an organic (cooperation of constituent elements forming a whole) manner.

In such a network, functions for enabling a user to enjoy various kinds of content, such as a television broadcast program that is being received, a recorded program, video/audio recorded on a medium such as a DVD (Digital Versatile Disc), or music, with a high degree of freedom, are realized.

Examples of such networks include a wireless LAN (Local Area Network) and a wired LAN. Examples of specifications for transmitting or receiving data on a LAN include a protocol that is formed as a specification by DLNA (Digital Living Network Alliance).

Regarding a television broadcast, information about program content can be electronically obtained by means of an EPG (Electronic Program Guide) and can be then presented to a user. This EPG can also be effectively used in the above-described home network. For example, by performing an operation on an EPG displayed on a television receiver, a remote controller or the like, it is possible for the user to select a desired program and to perform a scheduled program recording with a video recorder for use therewith.

Examples of the related art include Japanese Unexamined Patent Application Publication No. 1996-22653.

SUMMARY OF THE INVENTION

Viewing of a television broadcast will be described as a non-limiting example. When the user is viewing a broadcast program of a particular channel or is changing a channel, in order to know what is the kind of program currently being viewed, the user often wants to confirm the program title, the content, performers and the like.

In the present situation, in order to confirm the kind of program currently being viewed, the user needs to confirm the channel currently being viewed and the time, and needs to search through the radio/television column carried in a newspaper or a magazine. This is troublesome, and also, if a newspaper or the like is not at hand, it is not possible to immediately know what is the kind of program.

Of course, EPG display may be performed, for example, by causing a television receiver that the user is currently viewing or another device to display the EPG. However, similarly, the user himself/herself needs to confirm the information of the program currently being viewed from the channel and the time. Some systems or devices are not ready for performing EPG display, or if EPG display is performed by the television receiver being viewed, the program video is obstructed during that time by the EPG display, which is inconvenient.

That is, in the present situation, there is no technique for easily and simply obtaining information about the broadcast program that the user is viewing, and this is inconvenient.

In the foregoing, an example in which a broadcast program is being viewed is described. The same applies to a case in which, for example, when a recorded program or the like is being reproduced, the user wants to confirm information about the program and the like.

Accordingly, when content, such as a broadcast program or a recorded program, is output and a user views it, it is desirable to allow the user to easily confirm information on the content, so that convenience is improved.

According to an embodiment of the present invention, there is provided a content output system including: a content output apparatus; and an information display apparatus, the content output apparatus and the information display apparatus being capable of communicating with each other. The content output apparatus includes selection means for selecting, in response to a selection instruction, one piece of content from among a plurality of pieces of content that can be output, as content composed of a video signal and/or an audio signal; and output means for outputting the content selected by the selection means. The information display apparatus includes a display; and control means for allowing the display means to display, as content information display, information on the plurality of pieces of content that can be output from the content output apparatus in a state in which content that is output from the output means of the content output apparatus is displayed so as to be distinguished from remaining pieces of content that can be output.

The information display apparatus according to an embodiment of the present invention may include: communication means for communicating with external devices; display means; and control means for allowing the display means to display, as content information display, information on a plurality of pieces of content that can be output from the content output apparatus that is an external device in a state in which content that is output from the content output apparatus is displayed so as to be distinguished from remaining pieces of content that can be output.

The information display apparatus may further include operation means, wherein the control means allows the communication means to transmit a selection instruction to the content output apparatus in response to operation of the operation means, makes a determination as to what content is to be output by the content output apparatus on the basis of a selection instruction in response to operation of the operation means, and allows the display means to perform the content information display in a state in which the content is displayed so as to be distinguished from remaining pieces of content that can be output.

By receiving, via the communication means, notification information notifying what output content is to be transmitted from the content output apparatus, the control means may make a determination as to what content is to be output by the content output apparatus and may allow the display means to perform the content information display in a state in which the content is displayed so as to be distinguished from remaining pieces of content that can be output.

The control means may display in highlight, as the content information display, information on content that is output by the content output apparatus, on a display of a list of a plurality of pieces of content that can be output from the content output apparatus.

The control means may perform, as the content information display, display of a list of a plurality of pieces of content that can be output from the content output apparatus, and enlarged display of information on content that is output from the content output apparatus.

When display of a list of a plurality of pieces of content that can be output from the content output apparatus is being performed by the display means, the control means may allow, in response to content output from the content output apparatus, the display means to perform the content information display in a state in which content that is output by the content output apparatus is displayed so as to be distinguished from remaining pieces of content that can be output.

When display of a list of a plurality of pieces of content that can be output from the content output apparatus is not being performed by the display means, the control means may allow the display means to perform the display of the list when changing of content that is output by the content output apparatus or starting of content output is detected, and may allow the display means to perform the content information display in a state in which content output from the content output apparatus is displayed so as to be distinguished from remaining pieces of content that can be output. In this case, the control means may determine whether or not the content information display should be performed in response to display setting.

According to another embodiment of the present invention, there is provided a content output apparatus including: communication means for communicating with external devices; selection means for selecting one piece of content from among a plurality of pieces of outputable content, as content composed of a video signal and/or an audio signal, in response to a selection instruction; output means for outputting the content selected by the selection means; and control means for allowing the communication means to transmit, to an external device, notification information of content that is selected by the selection means and that is output by the output means.

According to another embodiment of the present invention, there is provided a content information display method for use with a content output system including a content output apparatus; and an information display apparatus, the content output apparatus and the information display apparatus being capable of communicating with each other. The content information display method includes the steps of: selecting and outputting one piece of content from among a plurality of pieces of content that can be output from the content output apparatus, as content composed of a video signal and/or an audio signal, in response to a selection instruction; and displaying information on the plurality of pieces of content that can be output from the content output apparatus on the information display apparatus in a state in which content that is output by the content output apparatus is displayed so as to be distinguished from remaining pieces of content that can be output.

That is, in an embodiment of the present invention, information about content that is selected and output by the content output apparatus is displayed so as to be distinguished from remaining pieces of content that can be output within a list display on the information display apparatus.

Content referred to in an embodiment of the present invention refers to data, such as a broadcast program to be received, a recorded program, and music, which is composed of video and/or audio content and which is viewed or listened to by the user. The content output apparatus selects and outputs one of a plurality of pieces of content. A broadcast program will be described as an example. A broadcast program from each broadcast station is content that can be output, and a channel change corresponds to an operation of selecting content that is to be output. At this time, if information on the broadcast program that is selected and output within each of outputable broadcast programs, is displayed on the information display apparatus side, it is possible for the user to confirm, on the information display apparatus side, the information on the broadcast program that is output by the content output apparatus when a channel change is performed. Regarding such a broadcast program, on the information display apparatus side, EPG display can be used as a list display. In that case, by explicitly displaying in highlight, etc., information about a broadcast program (that is, a broadcast program being viewed by the user) that is output on the content output apparatus side, it is possible for the user to recognize the information on the program in the EPG display.

According to embodiments of the present invention, since information about content that is output by the content output apparatus is displayed so as to be distinguished from remaining pieces of content that can be output on the information display apparatus side, the user can easily confirm the identity of content being viewed, for example, content of a broadcast program. For example, when a television receiver is used as the content output apparatus according to an embodiment of the present invention and a remote controller device having a display function is used as the information display apparatus according to an embodiment of the present invention, when the user views a television broadcast or performs a channel change, the user can confirm what the broadcast content is by using the remote controller device, which is very convenient.

BRIEF DESCRIPTION OF THE DRAWINGS

FIG. 16 is an illustration of a recording list and a highlight display when reproduction is performed using a video recorder according to an embodiment of the present invention.

DESCRIPTION OF THE PREFERRED EMBODIMENTS

Embodiments of the present invention will now be described below in the following order.
[1. Home network and example of configuration of each device]
[2. Example of processing performed when a channel change operation is performed using IP remote controller]
[3. Example of processing performed when a channel change operation is performed using television receiver]
[4. Example of processing performed when a channel change operation is performed using TV remote controller]
[5. Example of processing performed when reproduction operation of recorded program is performed]
[6. Advantages of embodiments and modifications]

Figure 1:
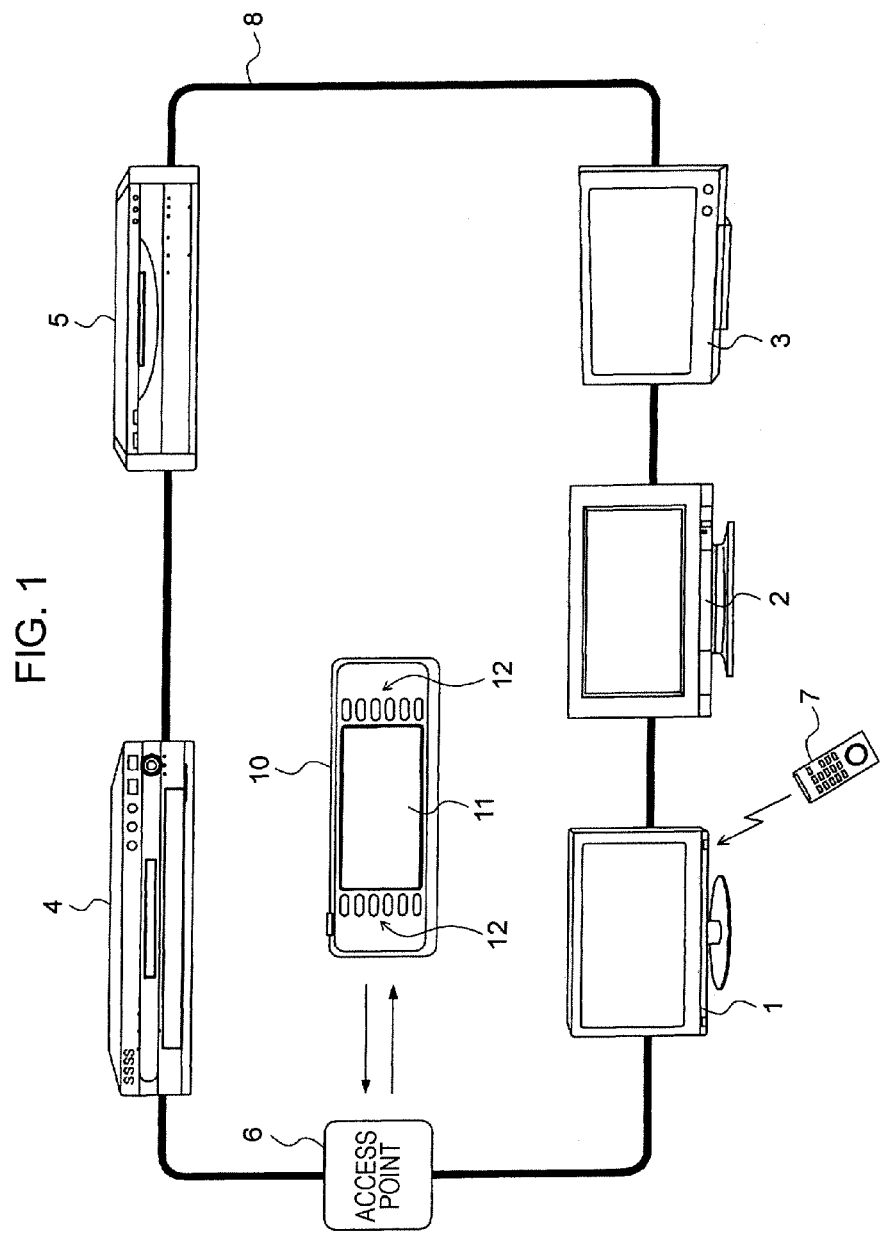
FIG. 1 is an illustration of a network configuration according to an embodiment of the present invention.

FIG. 1 shows an example of the configuration of a network system according to an embodiment of the present invention.

The network of FIG. 1 shows an example in which a plurality of devices are connected in a network so that they can communicate with one another in a house, an organization such as a company, or the like. In this case, television receivers 1, 2, and 3 and video recorders (recording/reproduction apparatuses) 4 and 5 can communicate with one another via a transmission line 8. The transmission line 8 is a wired transmission line or a wireless transmission line that constitutes a LAN.

The television receivers 1, 2, and 3 and the video recorders 4 and 5 in the network can function on a stand-alone basis and can also function in a coordinated manner.

A remote controller 7 transmits a command signal to a specific device, for example, the television receiver 1 by, for example, an infrared method.

An access point 6 is connected to the transmission line 8, so that an IP (Internet Protocol) remote controller 10 can communicate with each device in the network via the access point 6.

Each device in the network can be operated by means of an IP remote controller 10. The IP remote controller 10 enables transmission and reception of data, such as a command signal and video data, to and from each device in a network communication such as a wireless LAN.

The IP remote controller 10 is formed of a small and lightweight housing that can be held by the user, and includes, for example, a display section 11 made of a liquid-crystal panel and various kinds of operation keys 12. The user can operate each device and view video content by using the IP remote controller 10.

For example, the IP remote controller 10 is used to allow the television receivers 1, 2, and 3, the video recorders 4 and 5 and the like to be synchronously operated in an organic manner. While the user visually confirms the identity of video content stored in the video recorders 4 and 5, which is displayed on the IP remote controller 10, the user can select video content desired to be reproduced, can change the channels of the television receivers 1, 2, and 3, and can perform scheduled recording by specifying a program on the EPG display.

In this embodiment, descriptions are made with the assumption that examples of devices corresponding to the content output apparatus are the television receivers 1, 2, and 3, and an example of the information display apparatus is the IP remote controller 10.

Figure 2:
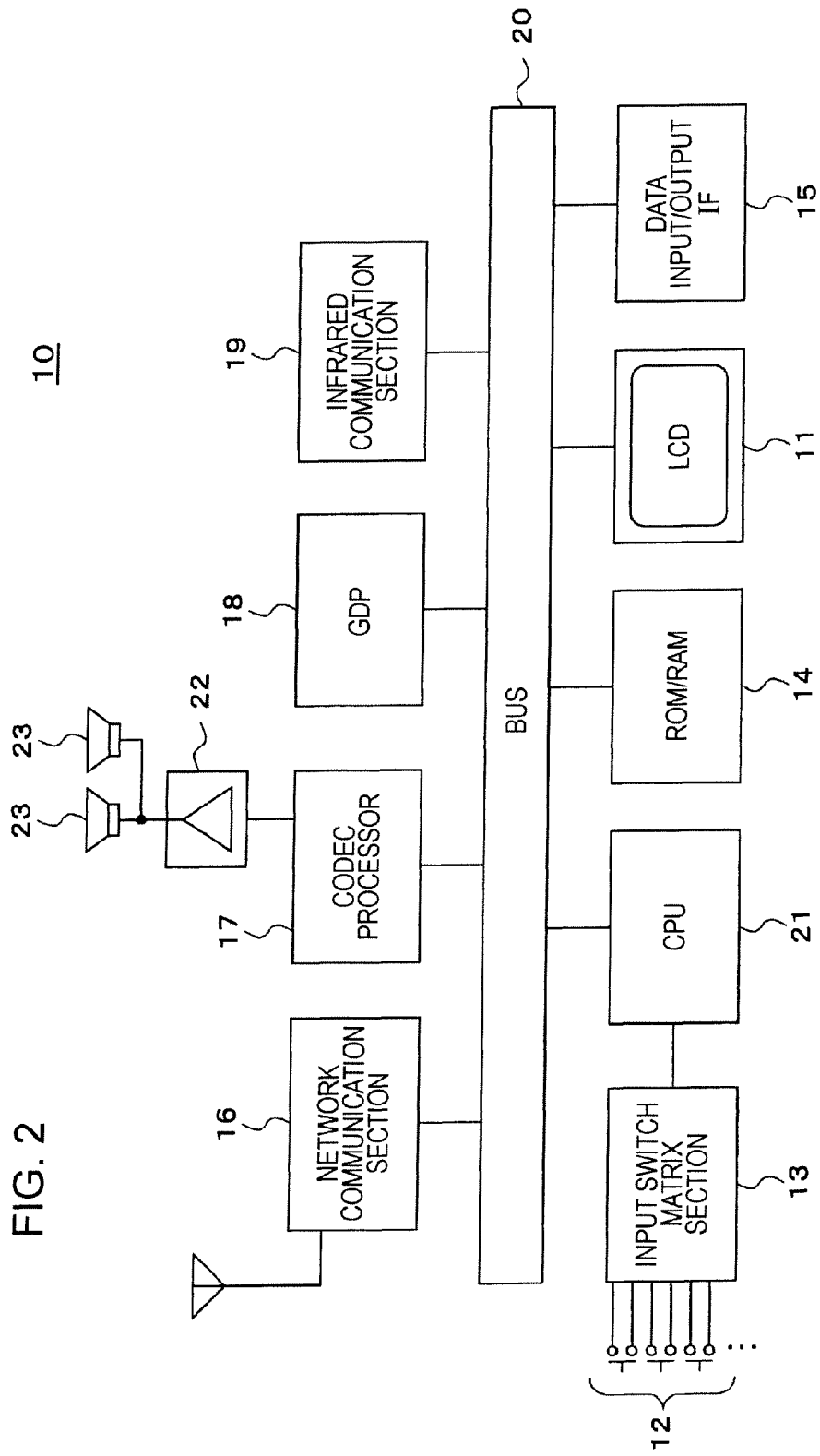
FIG. 2 is a block diagram of an IP remote controller according to an embodiment of the present invention.

FIG. 2 shows the internal configuration of the IP remote controller 10. Each section in the apparatus shown in FIG. 2 transmits and receives data and a control signal via a bus 20.

A CPU 21 performs computation processes necessary for each section to operate in the IP remote controller 10 and controls each section. The CPU 21 performs necessary control on the basis of information on operation using the operation keys 12, which is detected by an input switch matrix section 13.

A ROM/RAM 14 is used to store operation programs of the CPU 21 and to store various kinds of command information that is output by a remote controller. Also, the ROM/RAM 14 is used as a work area for computation processes or a buffer area for received data. In this example, an EPG display is performed in the IP remote controller 10, and EPG data is stored in the ROM/RAM 14.

As components of the ROM/RAM 14, various kinds of memory are employed including a ROM, a D-RAM, an S-RAM, a non-volatile memory, and the like.

A network communication section 16 performs data communication to and from each device in the network, as communication via the access point 6 shown in FIG. 1.

A data input/output interface 15 performs, for example, an interface process for communication with external devices by means of the network communication section 16. For example, the data input/output interface 15 performs a predetermined communication formatting process on a control signal and data to be transmitted by the CPU 21, transfers them to the network communication section 16 via the bus 20, whereby they are transmitted. Furthermore, the data input/output interface 15 performs a process for inputting various kinds of data received by the network communication section 16 and transfers the data to intended sections (the CPU 21, the ROM/RAM 14, a codec processor 17, a GDP (graphic display processor) 18 and the like) via the bus 20.

The codec processor 17 performs a decoding process, a digital audio process, a D/A conversion process, and the like on audio data to be output, and supplies an analog audio signal to an amplifier 22 so that audio output from a speaker 23 is performed.

The GDP 18 performs a process associated with video data to be output, a process for drawing various kinds of images, and the like. The video data processed or generated by the GDP 18 is supplied to the display section 11, whereby video display output is performed.

An infrared communication section 19 outputs an operation command signal to external devices by means of an infrared signal.

Figure 3:
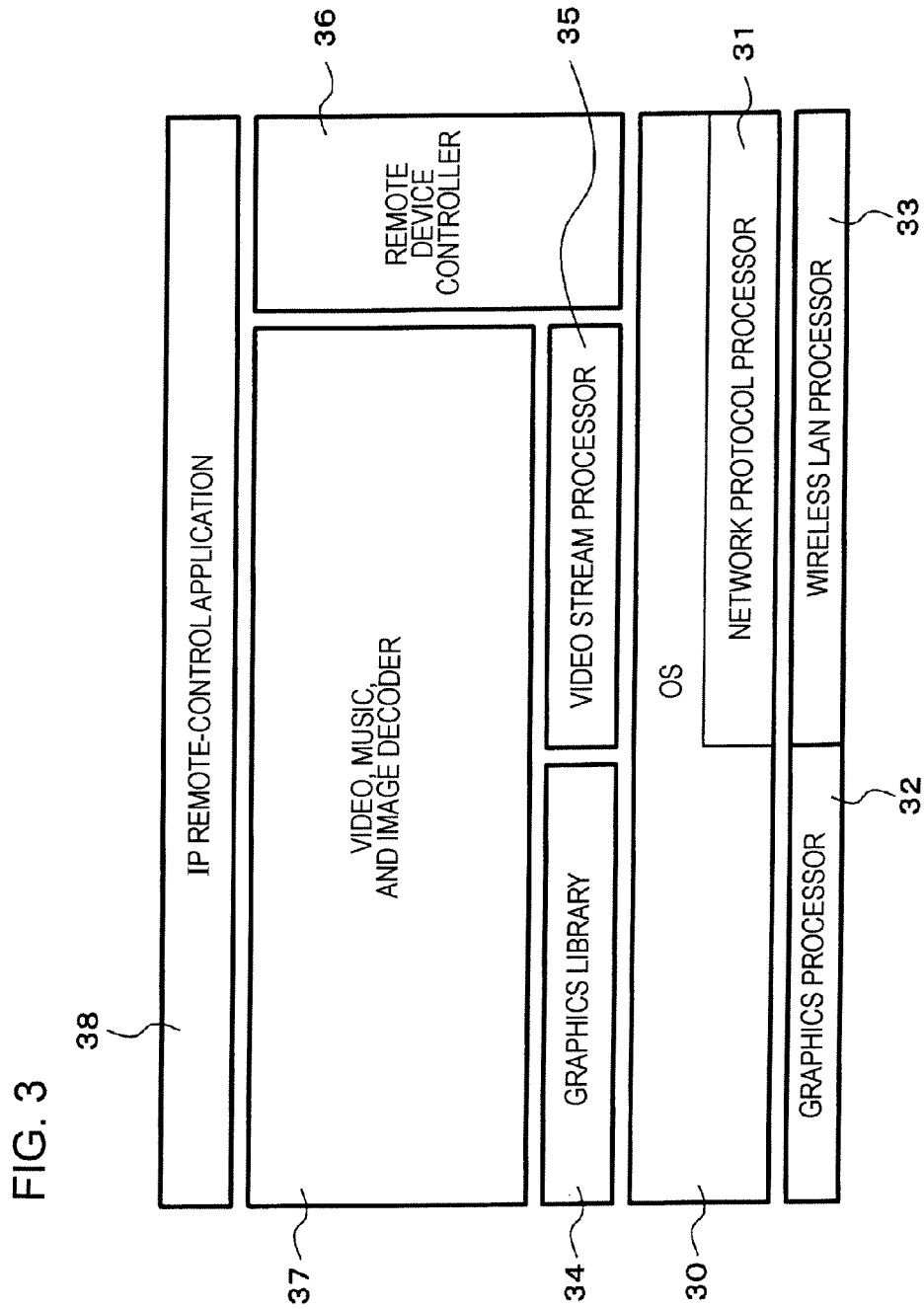
FIG. 3 is an illustration of a software configuration of the IP remote controller according to an embodiment of the present invention.

The configuration of software that functions in the CPU 21 is shown in FIG. 3.

As software functions, as shown in FIG. 3, an OS (Operating System) 30, a network protocol processor 31, a graphics processor 32, a wireless LAN processor 33, a graphics library 34, a video stream processor 35, a remote device controller 36, a video/audio/image decoder section 37, and an IP remote controller application 38 are formed.

The graphics processor 32 and the graphics library 34 that function in the system processing by an OS 30 control display operation on the display section 11. Furthermore, the network protocol processor 31 and the wireless LAN processor 33 control the operation of the network communication section 16 and the data input/output interface 15.

Furthermore, the video stream processor 35 and the video/audio/image decoder section 37 control processing associated with video data and audio data output from the display section 11 and the speaker section 23.

The remote device control section 36 controls the operation of transmitting control information to external devices through network communication.

The IP remote controller application 38 controls the operation of transmitting control information through network communication and the operation of outputting an infrared command signal.

The IP remote controller 10 having the above-described configuration enables, for example, various kinds of operations described below to be performed in the network shown in FIG. 1.

Operation as a normal remote controller that outputs an infrared command signal to each of the television receivers 1, 2, and 3 and the video recorders 4 and 5.

Operation for supplying a control signal to the television receivers 1, 2, and 3 and the video recorders 4 and 5 through network communication as a wireless LAN and for requesting for predetermined operation. For example, operation control of individual devices (power switching on/off, recording, reproduction, receiving channel setting, etc.) and instructions of related operations are possible. Examples of possible related operations include an instruction of operation of reproducing video content by the video recorder 4 and of displaying video content on the television receiver 2; and an instruction of operation of allowing broadcast video that is received and demodulated by the television receiver 3 to be recorded by the video recorder 5.

Operation of transmitting a video signal/audio signal that is received or reproduced by one of the television receivers 1, 2, and 3 and the video recorders 4 and 5 to the IP remote controller 10 and of outputting video/audio by the display section 11 and the speaker section 23 of the IP remote controller 10.

Operation of causing video displayed on the IP remote controller 10 to be displayed or recorded in the television receivers 1, 2, and 3 and the video recorders 4 and 5.

Operation of performing EPG display on the basis of the received EPG information. The operations associated with EPG display will be described later.

Figure 4:
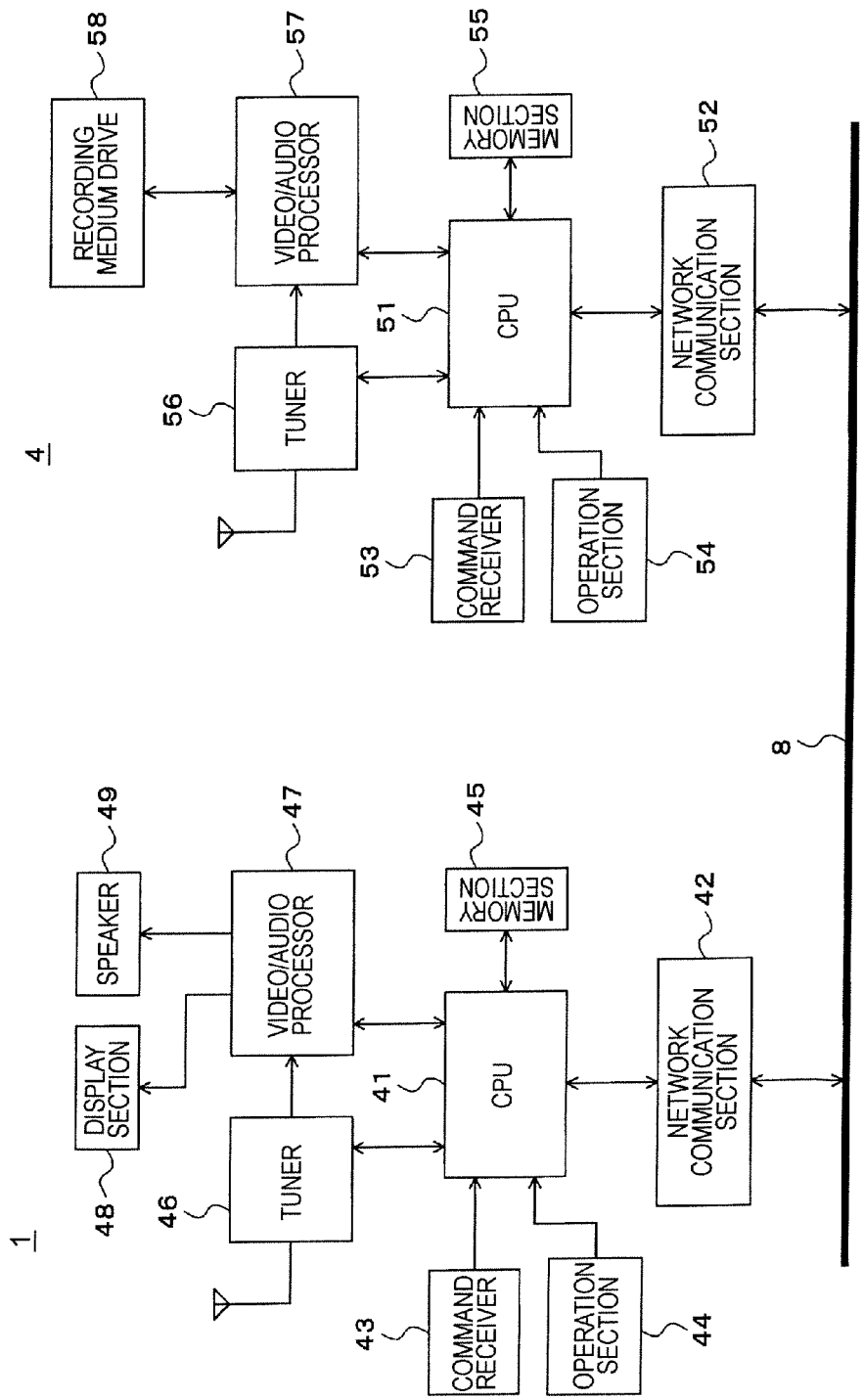
FIG. 4 is a block diagram of a television receiver and a video recorder according to an embodiment of the present invention.

FIG. 4 shows an example of the configuration of the television receivers 1, 2, and 3 and the video recorders 4 and 5 shown in FIG. 1. Here, the television receiver 1 and the video recorder 4 are shown.

The television receiver 1 includes a CPU 41, a network communication section 42, a command receiving section 43, an operation section 44, a memory section 45, a tuner section 46, a video/audio processor 47, a display section 48, and a speaker section 49.

The CPU 41 performs computation processing necessary for each section in the television receiver 1 to operate and control each section.

The network communication section 42 has a LAN communication interface function, and the CPU 41 performs communication with each device in the network of FIG. 1 by means of the network communication section 42.

The operation section 44 includes, for example, operation elements, such as operation keys provided on the television receiver housing.

The command receiving section 43 receives an infrared command signal from the TV remote controller 7 of, for example, an infrared method, converts the infrared command signal into an electrical signal, and then supplies it to the CPU 41. The CPU 41 detects an operation of the user using the operation section 44 and the TV remote controller 7 and performs intended control.

The memory section 45 includes a ROM, a D-RAM, an S-RAM, a non-volatile memory, and the like. The memory section 45 is used to store the operation program of the CPU 41, processing coefficients, setting information, EPG data, and the like and is also used as a work area for computation processes and used as a buffer area for network communication data.

The tuner section 46 performs a channel selection process and a demodulation process for a received broadcast wave, and obtains stream video data as a broadcast program. Various kinds of broadcast methods supported by the tuner section 46 are known, examples of which are a terrestrial digital broadcast, a terrestrial analog broadcast, and a digital or analog satellite broadcast of BS (Broadcasting Satellite), CS (Communication Satellite) or the like. The tuner section 46 need not necessarily to be configured to demodulate a broadcast wave received by an antenna, and may be a tuner or a decoder that can accept a so-called cable television broadcast or a streaming broadcast supplied via a network such as the Internet.

Furthermore, in the tuner section 46, EPG data superimposed on the broadcast signal is separated. The separated and extracted EPG data is supplied to, for example, the memory section 45.

The video/audio processor 47 performs necessary processing in order to output, from the display section 48 and the speaker section 49, a video signal and/or an audio signal serving as a broadcast program, which are received by the tuner section 46.

The video recorder 4 includes a CPU 51, a network communication section 52, a command receiving section 53, an operation section 54, a memory section 55, a tuner section 56, a recording/reproduction processor 57, and a recording medium drive 58.

The CPU 51 performs computation processing necessary for each section in the video recorder 4 to operate and control each section. The network communication section 52 has an interface function for LAN communication, and the CPU 51 performs communication with each device in the network of FIG. 1 by means of the network communication section 52.

The operation section 54 includes operation elements, such as operation keys provided on the housing of the video recorder 4. Furthermore, the command receiving section 53 receives an infrared command signal from the remote controller of an infrared method supported by the video recorder 4, converts the infrared command signal into an electrical signal, and supplies it to the CPU 51. The CPU 51 detects an operation by the user using the operation section 54 and the remote controller, and performs intended control.

The memory section 55 includes a ROM, a D-RAM, an S-RAM, a non-volatile memory, and the like. The memory section 55 is used to store the operation programs of the CPU 51, processing coefficients, setting information, EPG data, recording list information, scheduled recording list information, etc., and is also used as a work area for computation processing and as a buffer area for network communication data.

In the video recorder 4, the tuner section 56 performs a channel selection process and a demodulation process for received broadcast waves, and obtains stream video data as a broadcast program. Similar to the case of the television receiver 1, various kinds of broadcast methods and reception styles supported by the tuner section 56 are possible. Examples thereof include a terrestrial digital broadcast, a terrestrial analog broadcast, and a digital or analog satellite broadcast of BS, CS or the like. Furthermore, the tuner section 56 may also be a tuner or a decoder that can accept a cable television broadcast and a streaming broadcast supplied via a network such as the Internet. Also, in the tuner section 56, EPG data is separated, and the separated and extracted EPG data can also be stored in the memory section 55.

The recording medium drive 58 is, for example, an HDD (Hard Disk Drive).

The recording/reproduction processor 57 and the recording medium drive 58 record and reproduce a broadcast program. That is, when recording is to be performed, the recording/reproduction processor 57 performs a predetermined compression process and an encoding process for recording purposes on stream video data obtained by the tuner section 56, and supplies the stream video data to the recording medium drive 58.

The recording medium drive 58 records the supplied stream video data.

When reproduction is to be performed, the recording/reproduction processor 57 performs a decoding process and a decompression process on the compressed video data read by the recording medium drive 58, and outputs the video data in the form of the original stream video data.

The recording medium drive 58 may also be, in addition to an HDD, various kinds of recording media, such as an optical disc, a magnetic tape, and a solid-state memory.

In FIG. 4, an example of the configuration of the television receiver 1 and the video recorder 4 is shown. The other television receivers 2 and 3 and video recorder 5 can be configured substantially identically. Of course, the example of the configuration of the television receivers 1, 2, and 3 and the video recorders 4 and 5 is not limited to the configuration of FIG. 4, and various examples are possible.

In addition to the television receiver and the video recorder, the following various kinds may be connected to the network of FIG. 1: a personal computer, an audio reproduction device, an audio recording/reproduction device, a video monitor apparatus having no tuner functions, a tuner device for a television broadcast and a radio broadcast, an audio amplifier device, and a communication device with an external network, such as the Internet.

[2. Example of Processing when a Channel Change Operation is Performed using IP Remote Controller]

In this example, for example, in the above-described network, when a user changes a channel in order to view a television broadcast on the television receiver 1 or the like, the user can confirm the content of the broadcast program that is being output in the IP remote controller 10.

In the following, a description will be given of an example of operation when the television receiver 1 functions as a content output apparatus according to an embodiment of the present invention and the IP remote controller 10 functions as an information display apparatus according to an embodiment of the present invention. Content referred to herein in the embodiment of the present invention corresponds to a broadcast program of each channel.

Examples of techniques of user operation for changing a channel with respect to a broadcast program to be viewed by means of the television receiver 1 include a technique for operation using the IP remote controller 10, a technique for operation using panel keys (operation section 44) of the television receiver 1, and a technique for operation using the TV remote controller 7.

First, examples of operations when a channel change operation is performed using the IP remote controller 10 will be described as examples of processing I to IV of the IP remote controller 10.

In the IP remote controller 10, EPG display is performed as information of broadcast programs.

Figure 5:
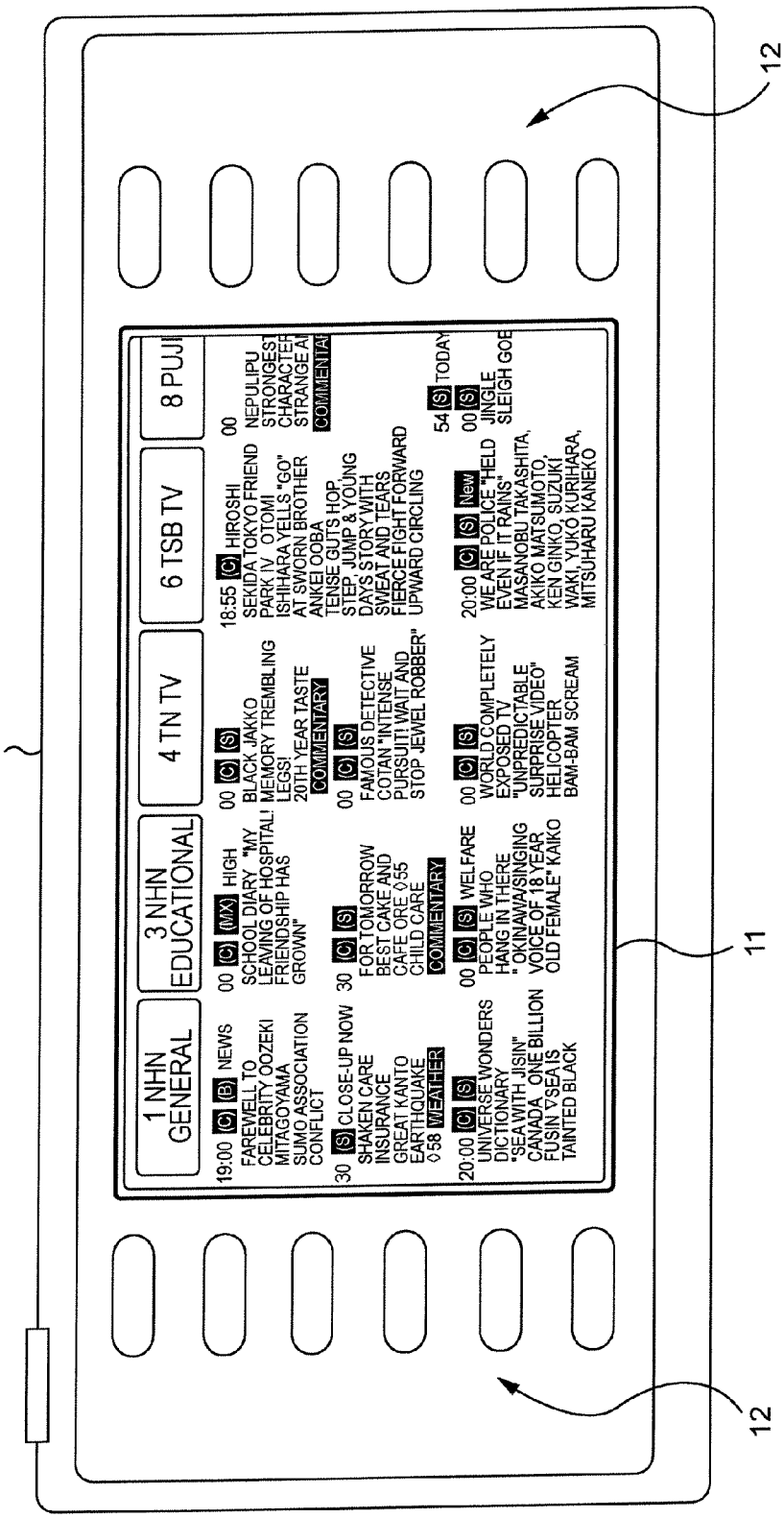
FIG. 5 is an illustration of EPG display in the IP remote controller according to an embodiment of the present invention.

FIG. 5 shows a state in which EPG display is performed on the display section 11, that is, a program table of broadcast stations of each channel is displayed. The IP remote controller 10 enables EPG display as shown in FIG. 5 on the basis of the obtained EPG data when the user performs an EPG display operation.

There are various techniques for obtaining EPG data. As shown in FIG. 4, when the television receiver 1, the video recorder 4, and the like has a tuner function, EPG data can be obtained from a broadcast wave. It is possible for the IP remote controller 10 to continually obtain up-to-date EPG data by allowing the EPG data obtained by the television receiver 1 or the like to be transferred through network communication.

Although not shown in FIG. 1, when a device, such as a personal computer, which can be connected to an external network, exists in the network, EPG data can be downloaded from the Internet and the like. Therefore, the downloaded EPG data may be transferred to the IP remote controller 10.

Furthermore, if the IP remote controller 10 has a broadcast wave reception function or a function of accessing Internet websites or the like, it is also possible for the IP remote controller 10 to obtain EPG data on its own.

A description will now be given below of an example of operation for presenting information of broadcast content to the user in response to the operation of changing a channel of a television broadcast by using such EPG data.

Figure 8:
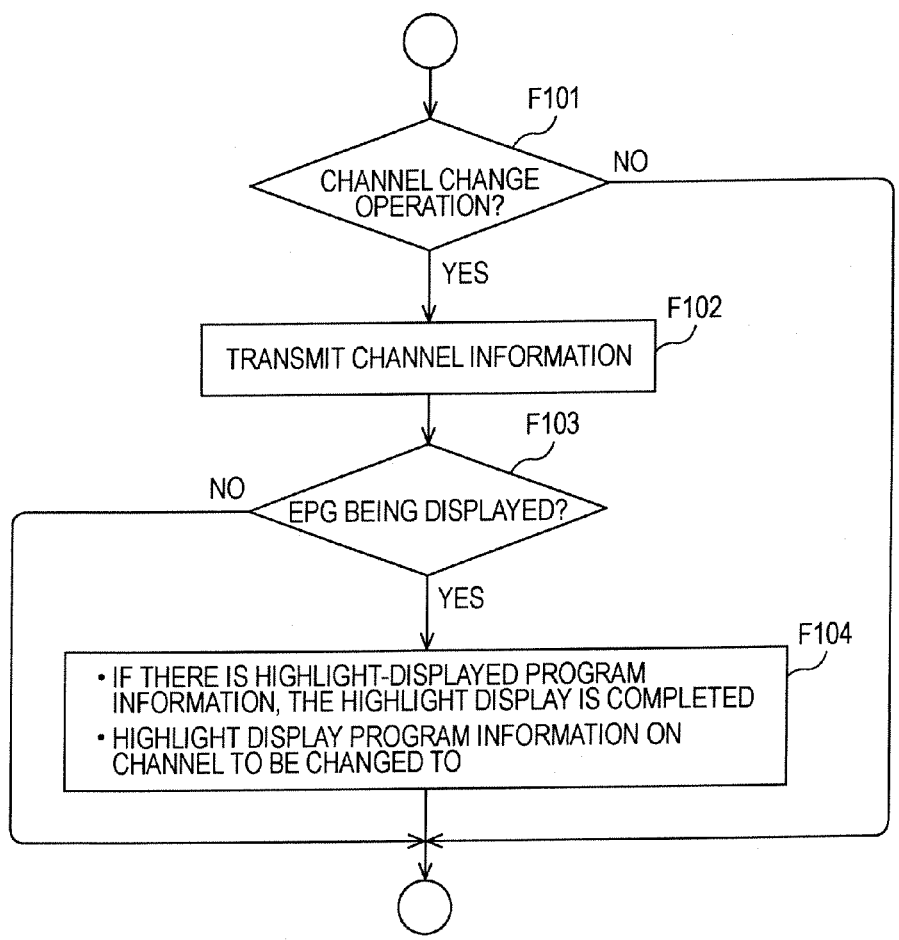
FIG. 8 is a flowchart of an example of processing I when a channel change operation is performed using the IP remote controller according to an embodiment of the present invention.

FIG. 8 shows an example of processing I when the user operates a channel by using the IP remote controller 10. This processing of FIG. 8 is processing of the CPU 21 of the IP remote controller 10. When the user operates a channel by means of the operation keys 12 in the IP remote controller 10 and the CPU 21 detects the operation, the process proceeds from step F101 to step F102, where information on the channel to be changed to is transmitted to the television receiver 1. In this case, the CPU 21 may transmit the channel information to the television receiver 1 through network communication from the network communication section 16 or may transmit the channel information as an infrared command signal from the infrared communication section 19. As a result of this processing, the CPU 41 of the television receiver 1 receives channel information via the network communication section 42 or the command receiving section 43, and performs control of changing a channel to be selected in the tuner section 46. As a result, in the television receiver 1, the program of the channel changed by the user is output, and the user enters into viewing the program.

Figure 6:
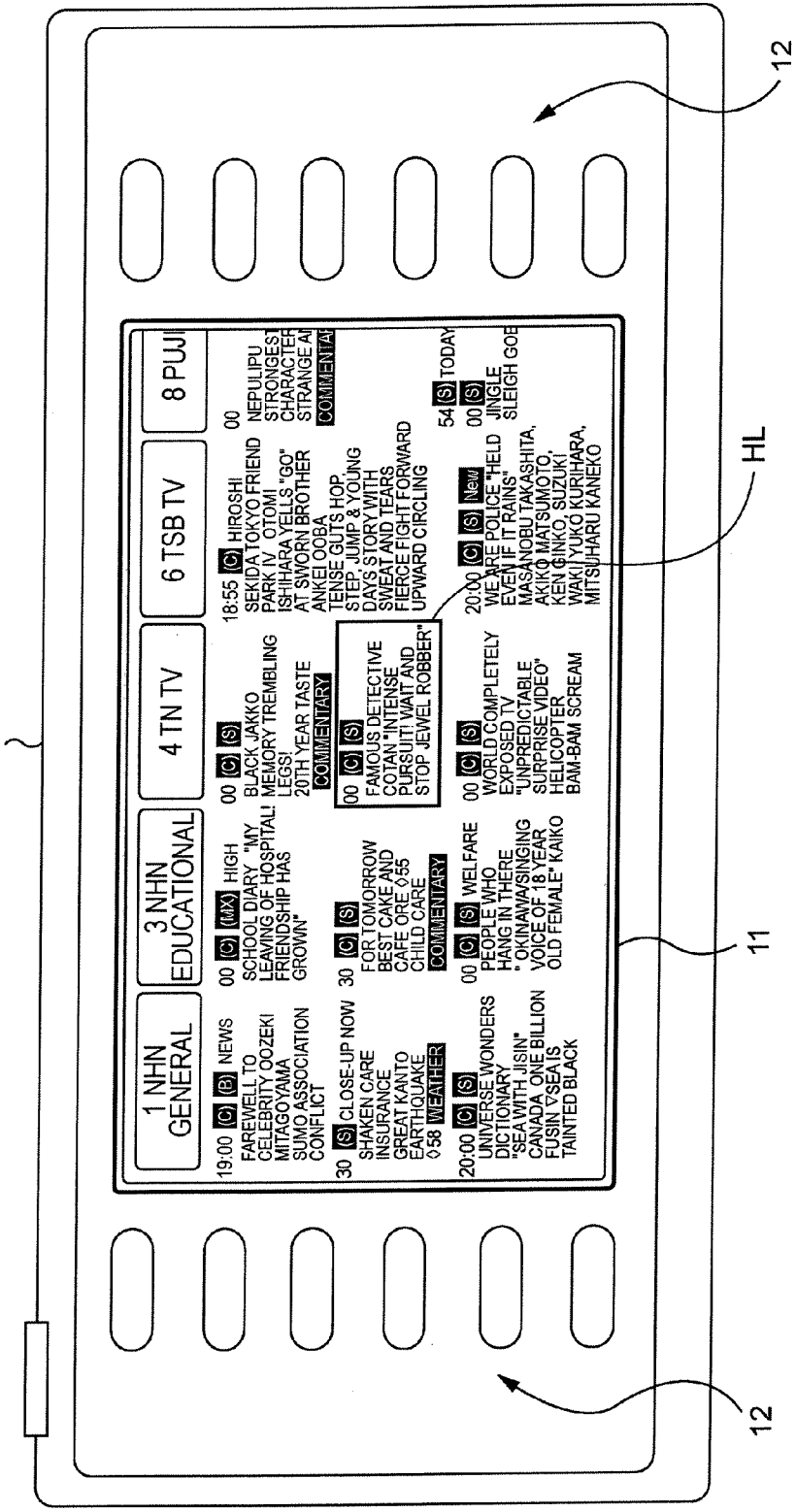
FIG. 6 is an illustration of an EPG and highlight display in the IP remote controller according to an embodiment of the present invention.

Next, in step F103, the CPU 21 determines whether or not EPG display is currently being performed by the display section 11, as shown in FIG. 5. If EPG display is not being performed, the CPU 21 directly ends processing associated with the channel change operation. If EPG display is being performed, the process proceeds to step F104, where the program information on the channel to be changed to is displayed in a highlight on the EPG display. That is, the CPU 21 can make a determination as to the channel of the program currently being displayed on the television receiver 1 on the basis of the channel information transmitted to the television receiver 1 in response to user operation. Therefore, the program information on the channel is displayed in highlights. FIG. 6 shows an example in which, as highlight display HL, the program information of the current changed channel is displayed so as to be distinguished from remaining pieces of content that can be output so that the user can recognize the program information. In the manner described above, by performing control such that highlight display HL is performed, processing associated with the channel change operation is completed.

Figure 7:
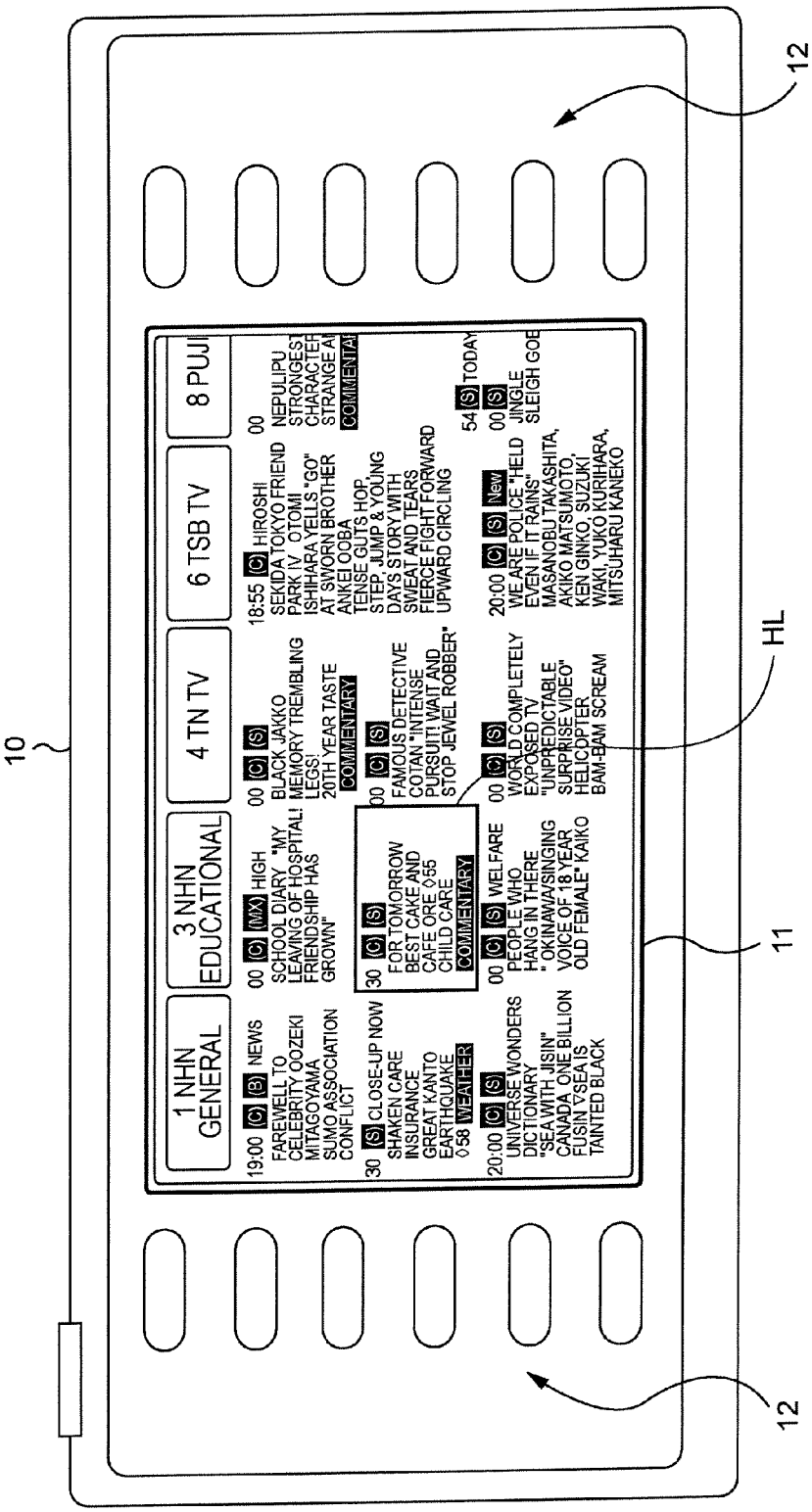
FIG. 7 is an illustration of an EPG and highlight display in the IP remote controller according to an embodiment of the present invention.

When the user performs a channel change operation by using the operation keys 12 again, processing of FIG. 8 is performed in a similar manner. For example, when an operation of changing from channel 4 to channel 3 is performed, in the process of step F104, with respect to the display of the IP remote controller 10, the program information highlighted as highlight display HL is changed from FIG. 6 to FIG. 7. For example, when the program information of channel 4 has been displayed in highlights as shown in FIG. 6, the highlight display is completed, and the program information of channel 3 is displayed in highlights as shown in FIG. 7.

As a result of such processing being performed, it is possible for the user to confirm the content of the program that is currently being displayed on the television receiver 1 by means of the display on the IP remote controller 10 while operating the IP remote controller 10.

As a result, it becomes easy for the user to determine whether or not the current program of the channel being viewed is a program desired to be viewed. There are many cases in which it is difficult to know whether or not the channel is the channel of the program desired to be viewed, such as when in particular the user is viewing the program shortly after the channel has been changed or when the changed channel is showing a commercial message (CM). However, since the current program is being displayed in highlights, it is possible to easily confirm the identity of the program.

Since the EPG display is a display of a list of programs, information on the programs of the other channels in the same time period can be confirmed. This is convenient to search for a program desired to be viewed and to search for a program desired to be viewed while somehow changing the channel.

Figure 9:
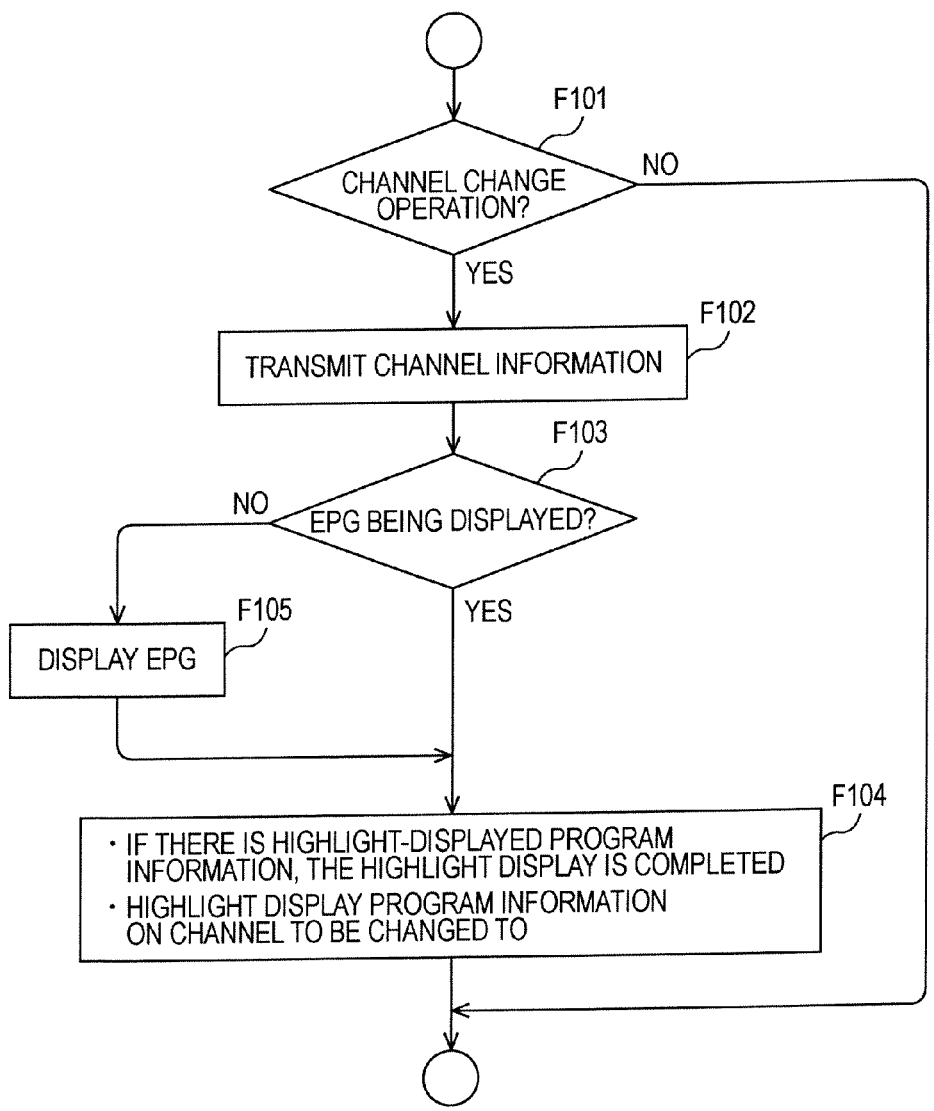
FIG. 9 is a flowchart of an example of processing II when a channel change operation is performed using the IP remote controller according to an embodiment of the present invention.

FIG. 9 shows an example of processing II when the user performs a channel change operation by using the IP remote controller 10. This processing of FIG. 9 is also processing of the CPU 21 of the IP remote controller 10.

Steps F101 to F104 in FIG. 9 are identical to steps F101 to F104 in FIG. 8, and accordingly, a duplicated description is omitted.

In this case, the difference of FIG. 9 from FIG. 8 is that, when the CPU 21 determines in step F103 that EPG display is not currently being performed on the display section 11, the process proceeds to step F105, where the display up to that point is changed to EPG display. Then, after EPG display is performed in step F105, the program information on the channel to be changed to is displayed in highlight in step F104.

That is, in the example of processing I in FIG. 8, the highlight display of the program information on the channel to be changed to is performed only when EPG display is being performed on the display section 11. However, in the example of processing II of FIG. 9, the display in highlights on the EPG display is performed regardless of the display content on the display section 11 when the channel is changed.

When the EPG display is not being performed when the channel change operation is performed and the process proceeds from step F103→step F105→step F104 and highlight display is performed on the EPG display, thereafter, the display may be continued until some operation by the user occurs. Alternatively, for example, if a fixed time has passed, the screen may be returned to the screen content immediately before the EPG display is performed in step F105.

Figure 10A:
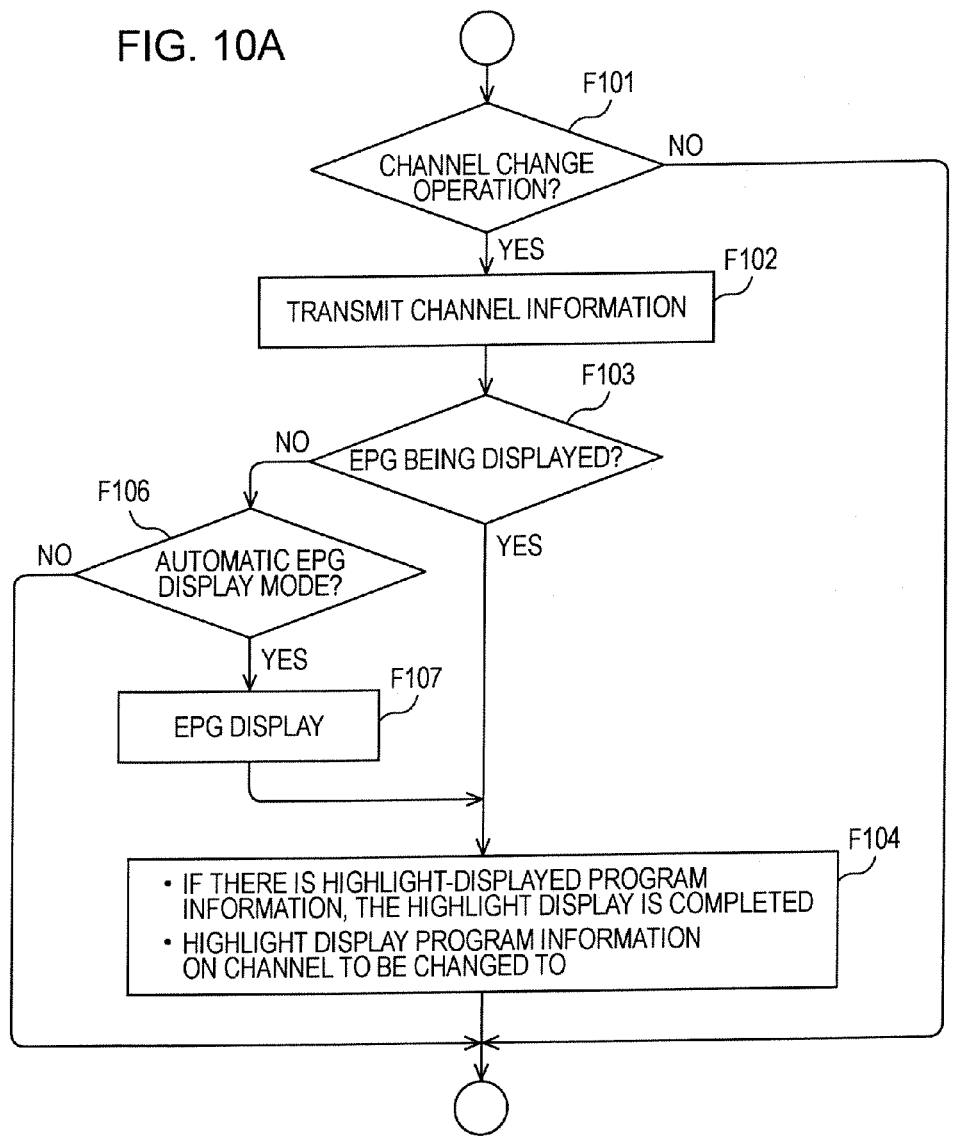
FIGS. 10A and 10B are illustrations of an example of processing III when a channel change operation is performed using the IP remote controller according to an embodiment of the present invention.
Figure 10B:
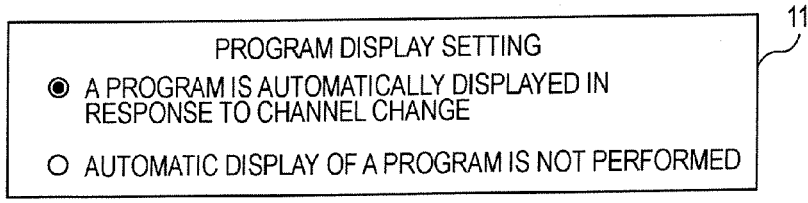

FIGS. 10A and 10B show an example of processing III when the user performs a channel change operation by using the IP remote controller 10.

In the above-described example of processing I of FIG. 8, the program information on the channel to be changed to is displayed in highlight only when the EPG display is being performed when the channel change operation is performed. On the other hand, in the example of processing II of FIG. 9, the program information on the channel to be changed to is displayed in highlight when the channel change operation is performed regardless of the display state during the change operation.

Which one of these processes is preferable in use differs for each user. Therefore, in an example of processing III, an example is shown in which whether or not EPG display should be performed is determined in response to the display setting by the user when a channel change operation is performed.

For example, in order to set the display mode when the channel change operation is performed, the CPU 21 allows the display section 11 to display a program table display setting screen shown in FIG. 10B so that the mode is set in response to an input by the user. The CPU 21 stores the information of the selected mode in the ROM/RAM 14.

On this screen, it is possible for the user to make a selection in advance so that EPG display is automatically performed when a channel change operation is performed or EPG display is not automatically performed.

Processing of the CPU 21 for reflecting such display setting is shown in FIG. 10A. Steps F101 to F104 are identical to those of FIGS. 8 and FIG. 9. In this case, when the CPU 21 determines in step F103 that EPG display is not currently been performed on the display section 11, the process proceeds to step F106, where it is determined whether or not a mode in which EPG display is automatically performed when a channel change operation is performed has been selected. If this mode has not been selected, the processing is directly completed. If the mode has been selected, the process proceeds to step F107, where the display up to that point is changed to EPG display, and the program information on the channel to be changed to is displayed in highlight in step F104.

That is, if the user selects in advance "Automatic display of a program table is not performed" on the setting screen of FIG. 10B, the processing of FIG. 10A becomes similar to that of FIG. 8. On the other hand, if "A program table is automatically displayed in response to the change of a channel", the processing of FIG. 10A becomes similar to that of FIG. 9.

As a result of the above, processing corresponding to the preference and necessity of an individual user is performed.

Figure 11:
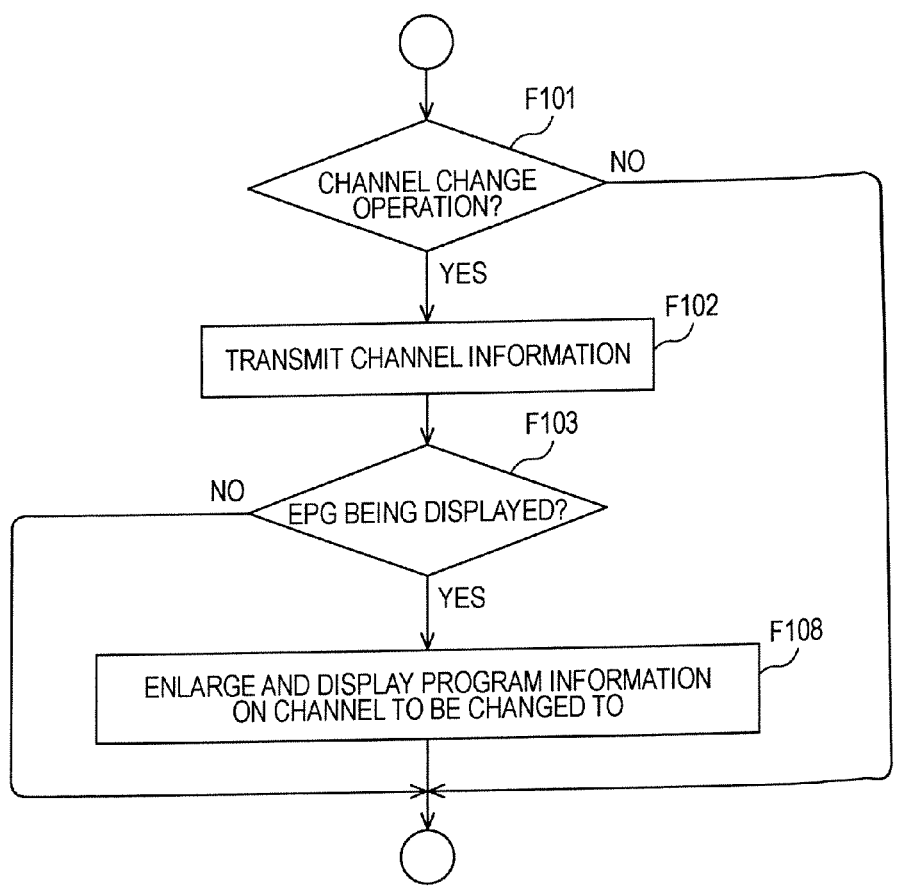
FIG. 11 is a flowchart of an example of processing IV when a channel change operation is performed using the IP remote controller according to an embodiment of the present invention.

FIG. 11 shows an example of processing IV.

Steps F101 to F103 are identical to those of FIG. 8. In the example of processing IV, when it is determined in step F103 that EPG display is being performed, the process proceeds to step F108, where the program information on the channel to be changed to is enlarged and displayed.

Figure 12:
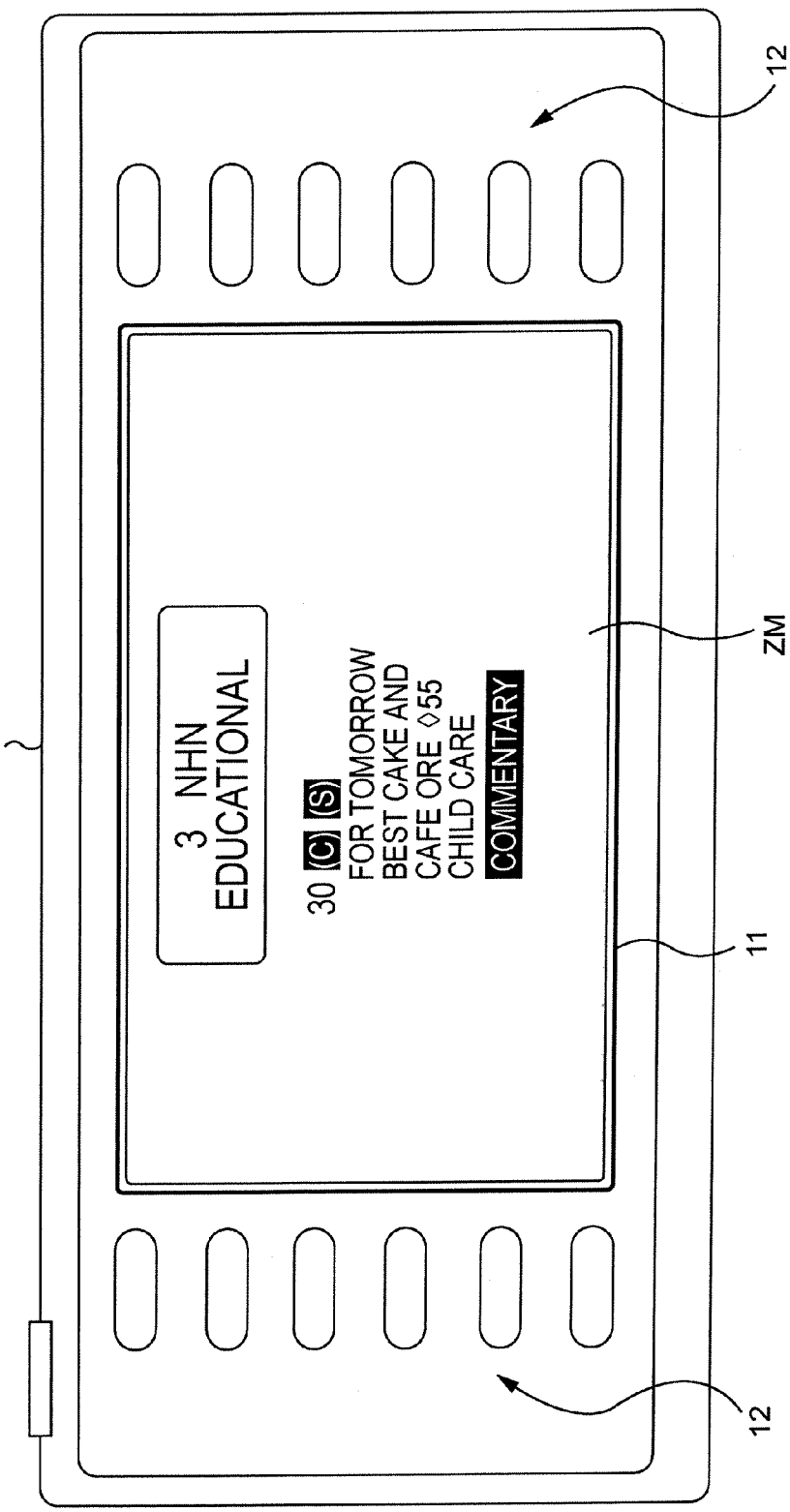
FIG. 12 is an illustration of enlarged display of program information in the IP remote controller according to an embodiment of the present invention.

For example, if the channel is assumed to be changed to channel 3 when EPG display shown in FIG. 5 is being performed, when the program information on the channel is enlarged on the display section 11 as shown in FIG. 12 in step F108, the current program information on the current channel is displayed so as to be distinguished from remaining pieces of content that can be output.

Such an enlarged display also enables the user to easily confirm the program content of the current channel.

When it is determined in step F103 that the EPG display is not being performed, after the EPG display is performed, the channel may be enlarged and displayed. For example, this is an example in which, after the display of FIG. 5 is performed once, the display of FIG. 12 is performed immediately after that. Alternatively, the display of a list of programs of FIG. 5 and the display of a list of programs of FIG. 12 may be switched for each fixed time. In addition, the display of FIG. 5 and the display of FIG. 12 may be switched as desired in response to user operation.

Alternatively, in these cases, rather than the display of FIG. 5, the display of FIG. 7 on which the program is displayed in highlight and the display of FIG. 12 may be switched.

In addition, the process of step F103 may be omitted in FIG. 11, so that the program information on the channel to be changed to is continually enlarged and displayed when a channel change operation is performed.

After the enlarged display of FIG. 12 is performed, if a fixed time passes, the display may be automatically changed to the original EPG display of FIG. 5 or to the display of FIG. 7 on which the program is displayed in highlight.

Furthermore, even if the EPG display is not being performed, when the enlarged display in step F108 is to be performed, the screen may be returned to the original screen content after a fixed time has passed or in response to user operation.

The execution of such an enlarged display of FIG. 12 may be selected in the display setting shown in FIG. 10B.

[3. Example of Processing when a Channel Change Operation is Performed on Television Receiver]

Next, a description will be given, with reference to FIG. 13, of processing when the user performs a channel change operation using the panel operation elements (the operation section 44 of FIG. 4) of the television receiver 1.

Figure 13:
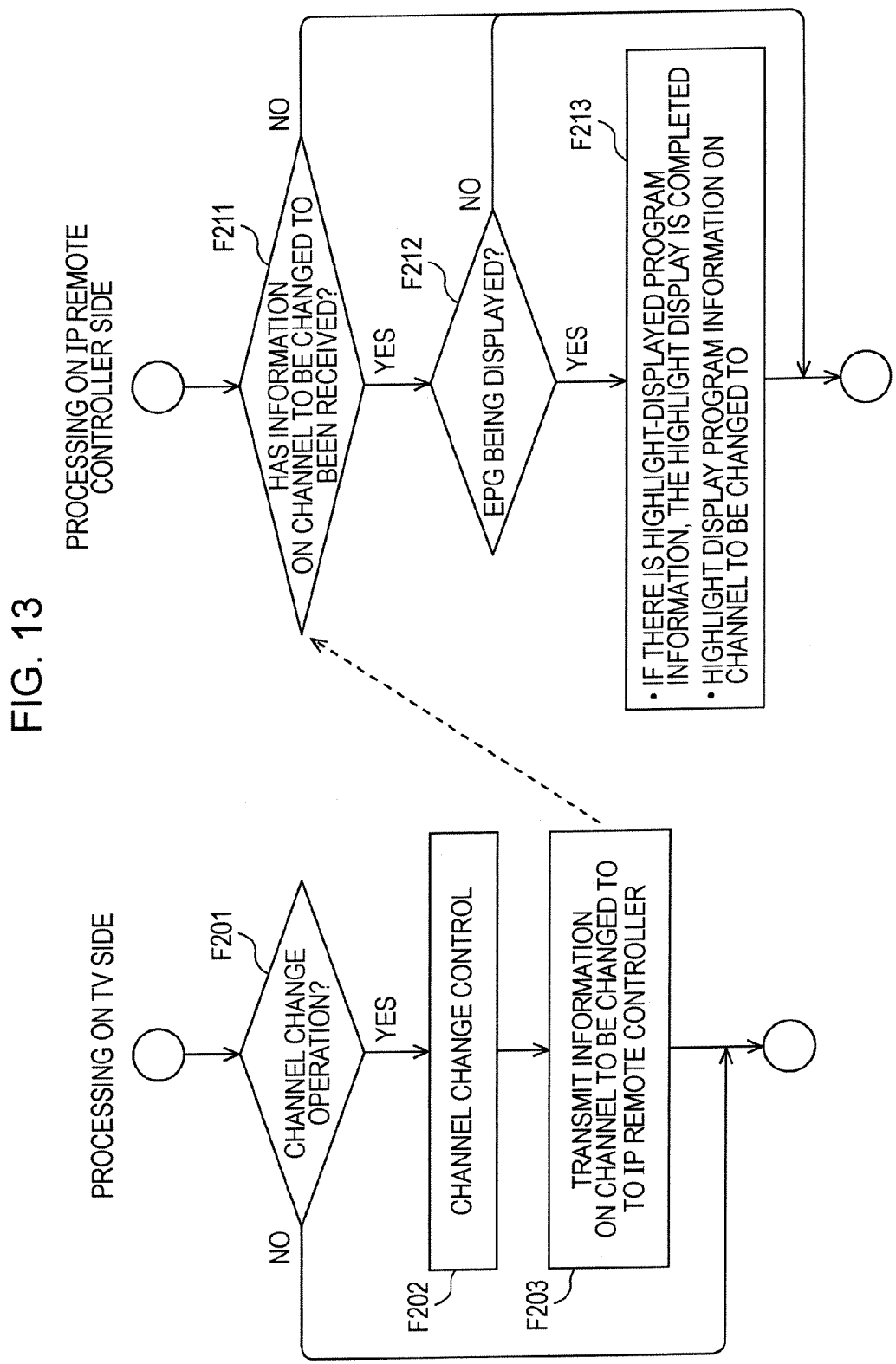
FIG. 13 is a flowchart of processing when a channel change operation is performed on a television receiver side according to an embodiment of the present invention.

FIG. 13 shows processing of the CPU 41 of the television receiver 1 and processing of the CPU 21 of the IP remote controller 10.

When the user performs a channel change operation from the operation section 44 of the television receiver 1 and the CPU 41 detects it, the process of the CPU 41 proceeds from step F201 to step F202, where the CPU 41 performs control for changing a channel to be selected in the tuner section 46.

As a result, in the television receiver 1, the program of the channel changed by the user is output, and the user enters into viewing the program.

At this time, in step F203, the CPU 41 notifies the IP remote controller 10 of the channel information on the channel to be changed to. That is, the channel information is transmitted as notification information from the network communication section 42 to the IP remote controller 10.

On the other hand, when the CPU 21 of the IP remote controller 10 receives the channel information from the television receiver 1, the process proceeds from step F211 to step F212. Then, it is determined whether or not the EPG display is currently being performed on the display section 11. If the EPG display is not being performed, the CPU 21 directly ends the processing associated with the channel information reception. However, if the EPG display is being performed, the process proceeds to step F213, where, if particular program information is being displayed in highlight up to that point, the processing is completed, and the program information on the channel to be changed to is displayed in highlight on the EPG display, as shown in, for example, FIG. 6. Then, the processing associated with the channel information reception is completed.

As a result, the user becomes able to confirm, on the IP remote controller 10 side, the content of the program that is output in response to the channel change operation on the television receiver 1 side.

The display operation in the IP remote controller 10 in this case corresponds to the processing of FIG. 8 described above. The processing described in FIG. 9, FIGS. 10A and 10B, and FIG. 11, or modifications thereof may also be performed on the IP remote controller 10 side.

[4. Example of Processing when a Channel Change Operation is Performed using TV Remote Controller]

Next, a description will be given, with reference to FIG. 14, of processing when the user performs a channel change operation on the television receiver 1 by using the TV remote controller 7.

Figure 14:
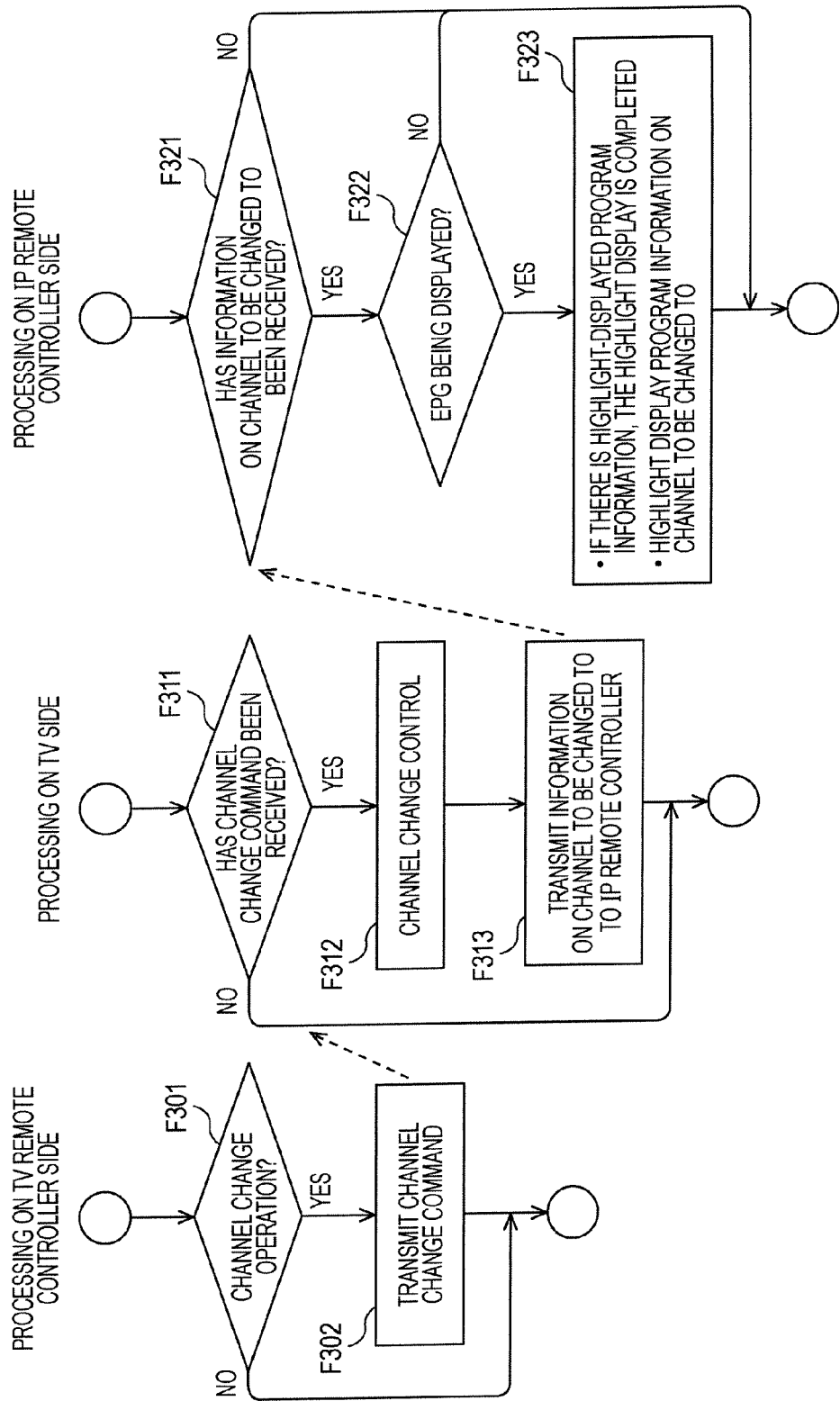
FIG. 14 is a flowchart of processing when a channel change operation is performed on a TV remote controller side according to an embodiment of the present invention.

FIG. 14 shows processing of the CPU within the TV remote controller 7, processing of the CPU 41 of the television receiver 1, and processing of the CPU 21 of the IP remote controller 10.

When the user performs a channel change operation by using the TV remote controller 7, the CPU within the TV remote controller 7 outputs an infrared signal as a channel change command in step F302 in response to the detection of user operation in step F301.

When the CPU 41 of the television receiver 1 detects a channel change command from the TV remote controller 7, which is received by the command receiving section 43, the process proceeds from step F311 to step F312, where the CPU 41 performs control so that the selection channel in the tuner section 46 is changed. As a result, in the television receiver 1, the program of the channel changed by the user is output, and the user enters into viewing the program.

At this time, in step F313, the CPU 41 notifies the IP remote controller 10 of the channel information on the channel to be changed to. That is, the channel information is transmitted as the notification information from the network communication section 42 to the IP remote controller 10.

When the CPU 21 of the IP remote controller 10 receives the channel information from the television receiver 1, the process proceeds from step F321 to step F322. Then, the CPU 21 determines whether or not EPG display is currently being performed on the display section 11. If EPG display is not being performed, the CPU 21 directly ends the processing associated with channel information reception. If EPG display is being performed, the process proceeds to step F323, where, if particular program information has been displayed in highlight up to that point, the processing is completed, and the program information on the channel to be changed to is displayed in highlight on the EPG display, as shown in, for example, FIG. 6. Then, the processing associated with the channel information reception is completed.

As a result, the user becomes able to confirm, on the IP remote controller 10 side, the content of the program that is output in response to the channel change operation using the TV remote controller 7.

The display operation in the IP remote controller 10 in this case corresponds to the processing in FIG. 8 described above. The processing described in FIG. 9, FIGS. 10A and 10B, and FIG. 11, or modifications thereof may also be performed on the IP remote controller 10 side.

[5. Example of Processing when Operation of Reproducing Recorded Program is Performed]

Each of the above-described examples shows an example in which program content is displayed so as to be distinguished from remaining pieces of content that can be output within the EPG display in the IP remote controller 10 in response to a channel change in the television receiver 1. In addition, when content is to be reproduced by the video recorder 4, that is, when a recorded program is to be reproduced, the information on the content to be reproduced and output can also be displayed so as to be distinguished from remaining pieces of content that can be output by means of the IP remote controller 10.

Figure 15:
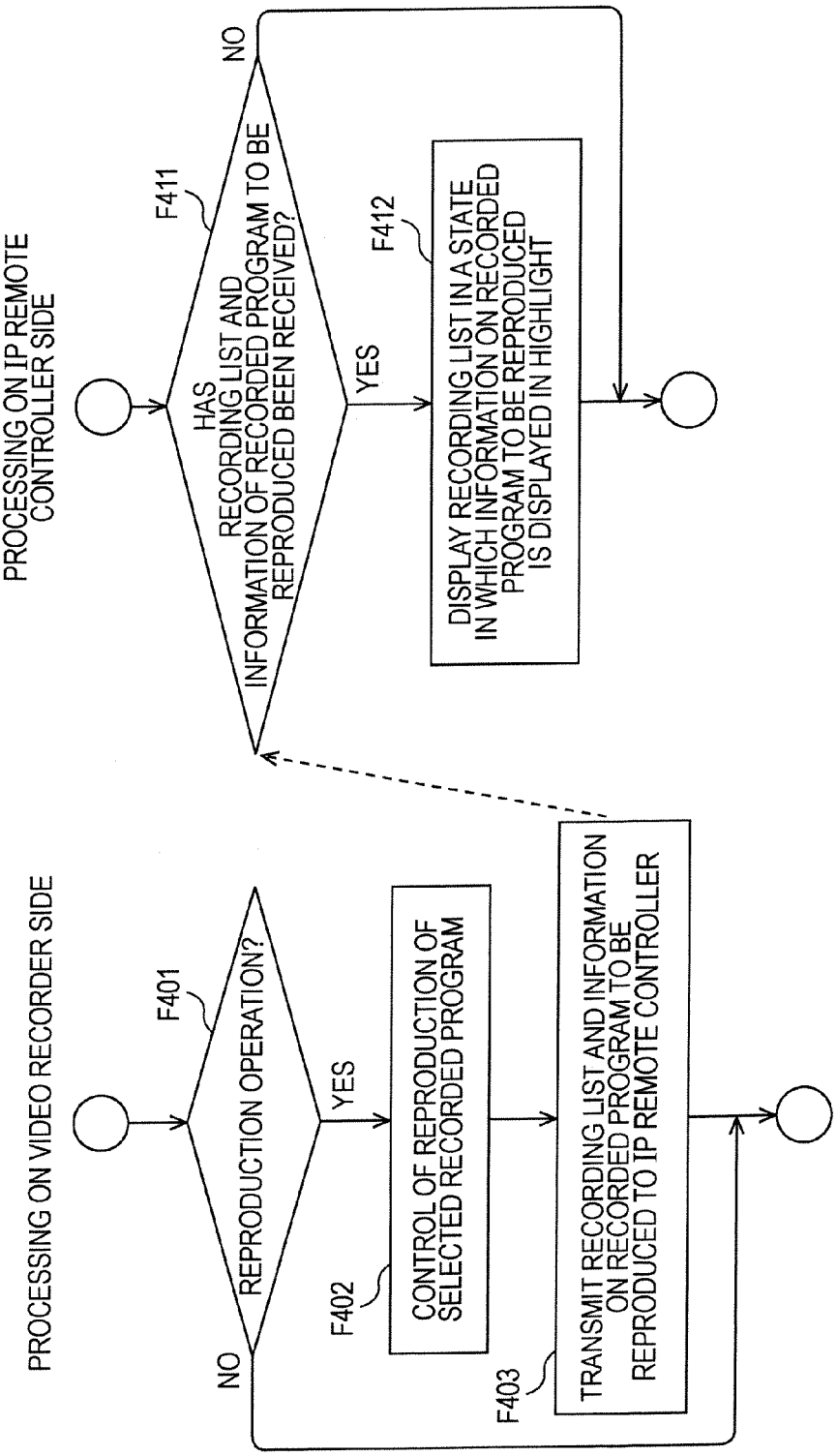
FIG. 15 is a flowchart of processing when reproduction is performed by a video recorder according to an embodiment of the present invention.

An example of processing in this case is shown in FIG. 15.

FIG. 15 shows processing of the CPU 51 of the video recorder 4 and processing of the CPU 21 of the IP remote controller 10. Content to be recorded in or reproduced from the video recorder 4 is assumed to be a broadcast program to be recorded.

When the user has performed an operation of reproducing particular content recorded in the recording medium drive 58 by using the operation section 54 of the video recorder 4, a remote controller corresponding to the video recorder 4 or the like, and when the CPU 51 detects the operation, the process proceeds from step F401 to step F402. In this step, the CPU 51 performs control so that the recording medium drive 58 and the recording/reproduction processor 57 are controlled to perform control to reproduce a specified recorded program.

As a result, the recorded program reproduced from the recording medium drive 58 is transferred to, for example, the television receiver 1 or the like and is output, and the user enters into viewing the recorded program.

At this time, in step F412, the CPU 51 notifies the IP remote controller 10 of a recording list and information of a recorded program to be reproduced, which is selected from among the recording list by the above-described operation. That is, a recording list and information of a program to be reproduced are transmitted as the notification information from the network communication section 52 to the IP remote controller 10.

When the CPU 21 of the IP remote controller 10 receives the recording list and information of the program to be reproduced from the video recorder 4, the process proceeds from step F411 to step F412. Then, on the display section 11, the recording list is displayed and also, the information of the recorded program, which is selected for reproduction and which is currently being reproduced, is displayed in highlight.

FIG. 16 shows an example in which a recording list is displayed and also, a program that is currently being reproduced from among the recording list is displayed so as to be distinguished from remaining pieces of content that can be output as highlight display HL.

As a result, the user becomes able to confirm, on the IP remote controller 10 side, the information on the recorded program that is being reproduced from the video recorder 4.

[6. Advantages of Embodiments and Modifications]

In the foregoing, various processing examples as embodiments have been described. According to these embodiments, the following advantages can be obtained.

First, when the channel of the television receiver 1 is changed, it is possible to easily confirm the identity of the program that is currently being output via the IP remote controller 10. As a consequence, the trouble of searching for a newspaper or the like for the purpose of confirming the identity of the program is eliminated. Since information including simple program content, performers and the like is contained in the EPG display, not only the program title but also those pieces of information can be confirmed. Therefore, this is convenient in searching for a program desired to be viewed.

Furthermore, since information on programs and the like is displayed in a list, the identifies of other programs that are being broadcast at the same time, which are not being viewed at that time, can be confirmed. Also in this regard, this is convenient in searching for a program desired to be viewed.

Of course, identical processing is also performed when a program is to be viewed using other television receivers 2 and 3. As a result, identical advantages can be obtained.

Furthermore, when reproduction is to be performed from the video recorders 4 and 5, the program to be reproduced can be known via the IP remote controller 10. For example, when a certain user is reproducing a recorded program, it is also possible to confirm whether the recorded program is being viewed by a family of the user or the like by viewing the content that is displayed in highlight in the recording list of the IP remote controller 10.

There are various operation methods for a channel change operation; for example, the IP remote controller 10 can be used, the operation section 44 of the television receiver 1 can be used, and the TV remote controller 7 can be used. As described above, in any of the operations, the program of the channel to be changed to can be confirmed via the IP remote controller 10. Therefore, it is not necessary for the user to be concerned about which operation should be performed to change the channel.

According to the processing example shown in FIG. 9, since EPG display and highlight display HL of the program being viewed are performed when the channel is changed, it is possible for the user to confirm the program by merely viewing the IP remote controller 10 when the channel is changed without being concerned with the EPG display operation in the IP remote controller 10.

On the other hand, as shown in FIGS. 10A and 10B, by determining as to whether or not the EPG display and the highlight display should be performed in response to the preference and necessity of the user, operations suitable for individual users can be performed.

As examples of an explicit display in the list display, highlight display and enlarged display of the program in the EPG display, and recording list display are shown. The present invention is not limited to such a display mode.

In place of highlight display, display in which only the program is displayed by a different color, display in which the program is surrounded by a frame cursor, or display in which the program is made to blink may also be said to be explicit displays.

In the above-described examples, with regard to the television receiver 1, an example in which the program is displayed in highlight when the channel is changed is described. Also, for example, when the television receiver 1 is switched on to start viewing, the program of the channel that is output at that time may also be suitably displayed in highlight. In that case, the television receiver 1 need only to transmit, to the IP remote controller 10, the information on the channel being selected when the power is switched on.

Thereafter, as described in the above examples, since display control is performed in response to the channel change, the IP remote controller 10 enables the program currently being viewed to be continually confirmed.

EPG display and recording list display are given as examples of display of programs to be viewed by means of the television receiver 1 and a list of programs recorded in the video recorder 4. It can also be assumed that content recorded on, for example, a CD, a DVD, a Blu-ray disc, and the like is displayed in a list so that the content is displayed so as to be distinguished from remaining pieces of content that can be output in response to the reproduction of particular content and in response to changing of content to be reproduced.

When a plurality of IP remote controllers 10 are connected in the network of FIG. 1, such processing as in the above-described examples should preferably be performed by all the IP remote controllers 10. Of course, customization is preferable so that the processing can be performed by only some of the IP remote controllers 10.

The IP remote controller 10 is given as an example of the information display apparatus according to the embodiment of the present invention. Alternatively, an apparatus other than the IP remote controller 10 may function as an information display apparatus according to the embodiment of the present invention. For example, since a PDA (Personal Digital Assistant), a personal computer, or a mobile phone performs processing described as processing of the IP remote controller 10, the apparatus can be realized as the information display apparatus according to the embodiment of the present invention.

Furthermore, in the network of FIG. 1, for example, the television receiver 1 and the television receiver 2 may also alternately function as a content output apparatus and an information display apparatus according to the embodiment of the present invention. For example, when a broadcast program is being viewed by means of the television receiver 1, EPG display in which a program is displayed in highlight on the television receiver 2 may be performed, whereas when a broadcast program is being viewed by means of the television receiver 2, EPG display in which a program is displayed in highlight on the television receiver 1 may be performed.

Generally, the control operations and content selection functions are performed in programmable circuitry that includes both hardware and software. The circuitry should not however be construed in a limiting context, but should be construed broadly. For example, the functionality can be performed in a specially designed circuit, a programmable circuit, or in software executed on a processor. Thus, selection and control "sections" as discussed herein include both hardware, software, and hybrid embodiments.

It should be understood by those skilled in the art that various modifications, combinations, sub-combinations and alterations may occur depending on design requirements and other factors insofar as they are within the scope of the appended claims or the equivalents thereof.

What is claimed is:

1. A content output system comprising:
a content output apparatus; and
an information display apparatus, the content output apparatus and the information display apparatus being capable of communicating with each other,
wherein the content output apparatus includes:
selection means for selecting, in response to a first selection instruction, a first piece of content from among a plurality of pieces of content that are available for output by the content output apparatus, each piece of content available for output being based on one or more of a video signal and an audio signal; and
an output port configured to output the first piece of content selected by the selection means, and
the information display apparatus includes:
a display; and
control means for controlling the display of the information display apparatus to display, based on channel information received from the content output apparatus corresponding to the first selection instruction received at the selection means of the content output apparatus and independent of a selection instruction received at the information display apparatus, information received via a network corresponding to the plurality of pieces of content that are available for output from the content output apparatus in a state in which information corresponding to the first piece of content currently output from the content output apparatus as a result of the first selection instruction received at the selection means of the content output apparatus is displayed so as to be distinguished from information corresponding to a first set of remaining pieces of content that are available for output,
wherein, in response to a second selection instruction received at the selection means of the content output apparatus, the control means controls the display to switch display thereof from the first piece of content to a second piece of content displayed in a state in which information corresponding to the second piece of content is displayed so as to be distinguished from information corresponding to a second set of remaining pieces of content.

2. An information display apparatus comprising:
communication means for communicating with a content output apparatus;
a display; and
control means for controlling the display of the information display apparatus to display, based on channel information received from the content output apparatus corresponding to a first selection instruction received at a selection means of the content output apparatus and independent of a selection instruction received at the information display apparatus, information received via a network corresponding to a plurality of pieces of content that are available for output from the content output apparatus in a state in which information corresponding to a first piece of content currently output from the content output apparatus as a result of the first selection instruction received at the selection means of the content output apparatus is displayed so as to be distinguished from information corresponding to a first set of remaining pieces of content that are available for output from the content output apparatus, wherein
the content output apparatus is external to the information display apparatus, and
in response to a second selection instruction received at the selection means of the content output apparatus, the control means controls the display to switch display thereof from the first piece of content to a second piece of content displayed in a state in which information corresponding to the second piece of content is displayed so as to be distinguished from information corresponding to a second set of remaining pieces of content.

3. The information display apparatus according to claim 2, further comprising:
an operation mechanism configured to be user-actuated,
wherein the control means allows the communication means to transmit a selection instruction in response to operation of the operation mechanism to the content output apparatus in response to operation of the operation mechanism.

4. The information display apparatus according to claim 2, wherein, when display of a list of information corresponding to the plurality of pieces of content that are available for output from the content output apparatus is not being performed by the display, the control means controls the display to display the list when changing of content currently output by the content output apparatus or starting of content output is detected, and controls the display to perform the content information display in a state in which the information corresponding to content currently output from the content output apparatus is displayed so as to be distinguished from the information corresponding to remaining pieces of content that are available for output.

5. The information display apparatus according to claim 4, wherein, when display of the list of information corresponding to the plurality of pieces of content that are available for output by the content output apparatus is not being performed by the display, the control means determines whether the display should perform the content information display in response to display setting when changing of content currently output by the content output apparatus or starting of content output is detected.

6. A content information display method for use with a content output system including a content output apparatus, and an information display apparatus, the content output apparatus and the information display apparatus being capable of communicating with each other, the content information display method comprising:

selecting and outputting, at the content output apparatus, a first piece of content from among a plurality of pieces of content stored in memory that are available for output from the content output apparatus, each piece of content available for output being based on one or more of a video signal and an audio signal, in response to a first selection instruction;

displaying, on a display of the information display apparatus, information about the plurality of pieces of content that are available for output from the content output apparatus on the information display apparatus, based on channel information received from the content output apparatus corresponding to the first selection instruction received at a selection section of the content output apparatus and independent of a selection instruction received at the information display apparatus, in a state in which information received by a network and corresponding to the first piece of content currently output by the content output apparatus as a result of the first selection instruction received at the selection section of the content output apparatus is displayed so as to be distinguished from information corresponding to a first set of remaining pieces of content that are available for output; and in response to a second selection instruction received at the selection means of the content output apparatus, switching display from the first piece of content to a second piece of content displayed in a state in which information corresponding to the second piece of content is displayed so as to be distinguished from information corresponding to a second set of remaining pieces of content.

7. A content output system comprising:
a content output apparatus; and
an information display apparatus, the content output apparatus and the information display apparatus being capable of communicating with each other, wherein the content output apparatus includes:
a selection section configured to select, in response to a first selection instruction, a first piece of content from among a plurality of pieces of content that are available for being output by the content output apparatus, each piece of content available for output being based on one or more of a video signal and an audio signal; and
an output section configured to output the first piece of content selected by the selection section, and
the information display apparatus includes:
a display; and
a control section configured to control the display of the information display apparatus to display, based on channel information received from the content output apparatus corresponding to the first selection instruction received at the selection section of the content output apparatus and independent of a selection instruction received at the information display apparatus, information received via a network regarding the plurality of pieces of content that are available for output from the content output apparatus in a state in which information corresponding to the first piece of content currently output from the content output apparatus as a result of the first selection instruction received at the selection section of the content output apparatus is displayed so as to be distinguished from information corresponding to a first set of remaining pieces of content that are available to be output, wherein, in response to a second selection instruction received at the selection section of the content output apparatus, the control section controls the display to switch display thereof from the first piece of content to a second piece of content displayed in a state in which information corresponding to the second piece of content is displayed so as to be distinguished from information corresponding to a second set of remaining pieces of content.

8. An information display apparatus comprising:
a communication section configured to communicate with a content output apparatus;
a display; and
a control section configured to control the display of the information display apparatus to display, based on channel information received from the content output apparatus corresponding to a first selection instruction received at a selection section of the content output apparatus and independent of a selection instruction received at the information display apparatus, information received via a network corresponding to a plurality of pieces of content that are available to be output from a content output apparatus in a state in which information corresponding to a first piece of content currently output from the content output apparatus as a result of the first selection instruction received at the selection section of the content output apparatus is displayed so as to be distinguished from information corresponding to a first set of remaining pieces of content that are available for output, wherein the content output apparatus is an external device, and
in response to a second selection instruction received at the selection section of the content output apparatus, the control section controls the display to switch display thereof from the first piece of content to a second piece of content displayed in a state in which information corresponding to the second piece of content is displayed so as to be distinguished from information corresponding to a second set of remaining pieces of content.

* * * * *